US011245154B2

(12) United States Patent
Rangelov et al.

(10) Patent No.: US 11,245,154 B2
(45) Date of Patent: Feb. 8, 2022

(54) ENVIRONMENTAL ENCLOSURES, SYSTEMS, AND METHODS, FOR USE WITH OFF-GRID OUTDOOR POWER SYSTEMS

(71) Applicant: International Power Supply AD, Sofia (BG)

(72) Inventors: Alexander Stoilov Rangelov, Sofia (BG); Filip Stoilov Rangelov, Sofia (BG); Kiril Todorov Marinov, Sofia (BG); Stoil Rangelov Trifonov, Sofia (BG)

(73) Assignee: International Power Supply AD, Sofia (BG)

( * ) Notice: Subject to any disclaimer, the term of this patent is extended or adjusted under 35 U.S.C. 154(b) by 0 days.

(21) Appl. No.: 16/915,153

(22) Filed: Jun. 29, 2020

(65) Prior Publication Data

US 2020/0335749 A1 Oct. 22, 2020

Related U.S. Application Data

(62) Division of application No. 16/830,006, filed on Mar. 25, 2020.

(Continued)

(51) Int. Cl.
*H01M 50/24* (2021.01)
*H01M 10/613* (2014.01)
(Continued)

(52) U.S. Cl.
CPC ......... *H01M 50/24* (2021.01); *H01M 10/613* (2015.04); *H01M 10/6563* (2015.04);
(Continued)

(58) Field of Classification Search
CPC ............ H01M 2/1094; H01M 2/1072; H01M 10/613; H01M 10/6563; H01M 10/6572; H01M 50/24; H01M 50/20
See application file for complete search history.

(56) References Cited

U.S. PATENT DOCUMENTS

| 5,314,762 | A | * | 5/1994 | Hamada | ............. | H01M 8/0271 |
| | | | | | | 429/408 |
| 2005/0202310 | A1 | * | 9/2005 | Yahnker | ................. | B25F 5/008 |
| | | | | | | 429/62 |
| 2011/0300420 | A1 | * | 12/2011 | Johnson, Jr. | ...... | H01M 10/6563 |
| | | | | | | 429/62 |

FOREIGN PATENT DOCUMENTS

| CN | 104577261 A | 4/2015 |
| CN | 208184315 U | 12/2018 |

(Continued)

OTHER PUBLICATIONS

International Search Report and Written Opinion for International Application No. PCT/IB2020/052951, European Patent Office, Netherlands, dated Aug. 21, 2020, 20 pages.

*Primary Examiner* — Jimmy Vo

(74) *Attorney, Agent, or Firm* — Sterne, Kessler, Goldstein & Fox P.L.L.C.

(57) ABSTRACT

An environmental enclosure is disclosed. The environmental enclosure may include sidewalls defining an enclosure volume, each of the sidewalls having an internally facing surface and an externally facing surface, and a solar shield comprising a reflective surface. The solar shield is spaced a first distance externally from the enclosure volume and is connected to a sidewall. The first distance defines a portion of a flow area that is configured to produce stack effect draft.

20 Claims, 13 Drawing Sheets

Related U.S. Application Data

(60) Provisional application No. 62/826,716, filed on Mar. 29, 2019.

(51) Int. Cl.
  *H01M 10/6563* (2014.01)
  *H01M 10/6572* (2014.01)
  *H01M 50/20* (2021.01)

(52) U.S. Cl.
  CPC ....... *H01M 10/6572* (2015.04); *H01M 50/20* (2021.01); *H01M 2220/10* (2013.01)

(56) References Cited

FOREIGN PATENT DOCUMENTS

| | | |
|---|---|---|
| GB | 2507822 A | 5/2014 |
| WO | 2002/052107 A2 | 7/2002 |
| WO | 2019/075293 | 4/2019 |

* cited by examiner

ENVIRONMENTAL ENCLOSURES, SYSTEMS, AND METHODS, FOR USE WITH OFF-GRID OUTDOOR POWER SYSTEMS

CROSS-REFERENCE TO RELATED APPLICATIONS

The present application is a division of U.S. patent application Ser. No. 16/830,006, filed Mar. 25, 2020, which claims the benefit of U.S. Provisional Patent Application No. 62/826,716, filed Mar. 29, 2019. These applications incorporated herein by reference in their entireties, for all purposes.

BACKGROUND

With a rise in the reliance on renewable energy, new challenges arise in storing energy at off-grid facilities. Such challenges include the conversion of stored energy, the distribution of stored energy, and supplying stored energy to multiple sites. Today, off-grid energy storage systems allow multiple sites to store renewable energy locally. These systems allow off-grid facilities to rely on renewable energy sources when available and allow for the use of locally stored energy when needed. Further, off-grid storage systems may transfer the stored energy at one site to another site as demand varies from site to site.

However, delivering the stored energy from one site to another site as DC power, for example, results in a noticeable loss of efficiency. Due to this, a large amount of the energy stored at one site will be lost when it is transferred as DC power to another site. Additionally, when an off-grid energy storage system malfunctions, the energy stored can no longer be delivered to another site until the system has been repaired. This leaves a site without access to the stored energy until repairs have been made to the system.

A further complication for off-grid storage systems is that infrastructure equipment must operate in the harsh ambient conditions. Such infrastructure may include systems for monitoring, communication, measurement, regulation, protection, etc., of several types of end user equipment, such as pipeline equipment. Typically, though not required, these systems reside in remote areas without electrical grid infrastructure for connection and power supply. Many locations are in regions with vast unpopulated territory, e.g., Africa or Middle East regions and their desert areas, tundra regions, etc. Other such locations may be at sea, polar regions, or similar extreme environments.

Due to the presence of extractable natural resources across such unpopulated areas, a wide range of supporting infrastructure is needed, such as oil and gas, telecommunications, water, power and electricity, etc. Practically speaking, each of these types of supporting infrastructures requires electricity. Therefore, power supplies using fuel based generators (e.g., diesel generators) running nonstop, or autonomous power systems based on solar energy and battery back-up are often required. Such autonomous power systems face many challenges including thermal management, air filtering, risk of death due to remote location, high operating expenses, high installation costs, low overall efficiency.

Accordingly, there remains a need for a simple, highly efficient environmental enclosure that addresses these challenges. In addition, long-term viability of such a system must be also taken into consideration.

BRIEF SUMMARY

Systems and methods related to environmental enclosure devices and smart infrastructure management systems are disclosed.

Some embodiments are directed to an environmental enclosure. In some embodiments, the environmental enclosure comprises sidewalls defining an enclosure volume, each of the sidewalls has an internally facing surface and an externally facing surface, and a solar shield comprising a reflective surface, the solar shield spaced a first distance externally from the enclosure volume and connected to a sidewall, the first distance defining a portion of a flow area. In some embodiments, the flow area is configured to produce stack effect draft.

In some embodiments, the environmental enclosure comprises a battery within the enclosure volume. The battery can comprise one or more a lead-acid batteries, lithium-ion batteries, sodium-ion batteries, potassium-ion batteries, nickel-based batteries, polymer-based batteries, polysulfide bromide batteries, silver-oxide batteries, metal-air silicon-air batteries, glass batteries, organic radical batteries, and rechargeable fuel cells, or various combinations thereof.

In some embodiments, the stack effect draft is proportional to one of the flow area and the square root of an effective height of the solar shield. In some embodiments, the environmental enclosure further comprises a solar shield disposed on a roof of the environmental enclosure, and the stack effect draft is directed between the solar shield disposed on a roof of the environmental enclosure and the roof of the environmental enclosure. In some embodiments, the solar shield has a solar reflectance index configured to optimize reflectance. In some embodiments, the solar shield is substantially planar along the area of the wall, and is positioned substantially parallel thereto.

In some embodiments, the environmental enclosure includes a second solar shield comprising a reflective surface. The second solar shield can be spaced a second distance externally from the enclosure volume different from the first distance, and can be connected to a sidewall. The second distance can define a portion of a second flow area. In some embodiments, the second flow area is also configured to produce a stack effect draft. In some embodiments, the second distance is greater than the first distance.

In some embodiments, the environmental enclosure comprises a battery chamber within the enclosure volume configured to house a battery. In some embodiments, the battery chamber includes insulated chamber sidewalls defining a chamber volume, a chamber top wall enclosing the chamber volume, and a heat exchange system configured to maintain the chamber between about 15° C. and 30° C. In some embodiments, the outside temperature is between about −40° C. and 65° C., while the chamber is maintained at an appropriate range. In some embodiments, the insulated chamber sidewalls have an R-value specified to maintain a specific temperature differential.

In some embodiments, the environmental enclosure comprises a heat exchange system. In some embodiments, the heat exchange system includes a fan disposed within the battery chamber. In some embodiments, the heat exchange system does not include a vapor compression system. In some embodiments, the heat exchange system further includes a fan disposed within the enclosure volume and outside of the battery chamber and configured to produce airflow across a heat sink in thermal contact with the Peltier element. In some embodiments, an appropriate voltage is applied across the Peltier element to dislodge particles attached to the heat sink. In some embodiments, the heat exchange system is configured to cool the battery chamber when a temperature of the battery chamber exceeds a first threshold for a first duration. In some embodiments, the heat exchange system is configured to heat the battery chamber when a temperature of the battery chamber is below a second threshold for a second duration, such that the temperature of the battery chamber is stabilized.

In some embodiments, the heat exchange system further comprises a Peltier element disposed between an inner surface of the battery chamber and an outer surface of the battery chamber, and the Peltier element is configured to selectively heat or cool the battery chamber. In some embodiments, the heat exchange system further comprises a heat sink in thermal contact with a surface of the Peltier element and in thermal contact with a heat pipe, such that the heat sink transfers heat between the Peltier element and the heat pipe. In some embodiments, the heat exchange system further includes a heat sink in thermal contact with a surface of the Peltier element. In some embodiments, the heat sink is disposed within the battery chamber. In some embodiments, the heat sink is disposed within the enclosure volume.

Some embodiments are directed to an environmental enclosure comprising sidewalls defining an enclosure volume that includes a battery chamber, wherein each of the sidewalls has an internally facing surface and an externally facing surface. In some embodiments, the environmental enclosure includes a variable air intake disposed in a sidewall of the enclosure defining an air inlet for an airflow path. And a baffle can be included that extends from a top internally facing surface towards a lower internally facing surface, and is configured such that a first portion of air contamination is directed to the floor of the enclosure volume. The environmental enclosure also comprises a cyclone system disposed downstream of the baffle. In some embodiments, the cyclone system includes an air intake configured to receive an air volume having a second portion of air contamination, a cyclone generating zone, a first conical outlet configured to remove the second portion of air contamination, and a second outlet disposed within the first conical outlet and coupled to an air inlet of a battery chamber. In some embodiments, the second outlet provides clean air to the battery chamber.

In some embodiments, the variable air intake is disposed behind a solar shield connected to the externally facing surface of a sidewall. In some embodiments, the variable air intake is configured to open in response to a first gage air pressure threshold. In some embodiments, the first gage air pressure threshold is measured at a location selected from within the battery chamber, within the enclosure volume, or external to the enclosure volume. In some embodiments, the variable air intake is configured to close in response to a second gage air pressure threshold. In some embodiments, the second gage air pressure threshold is measured at a location selected from within the battery chamber, within the enclosure volume, or external to the enclosure volume.

In some embodiments, the environmental enclosure comprises a fan disposed within the battery chamber configured to provide a suction pressure to introduce clean air into the battery chamber. In some embodiments, the fan is configured to be put into an off-state in response to the variable air intake being closed. In some embodiments, the environmental enclosure includes a cleaning system configured to automatically remove the first portion of air contamination from the enclosure volume.

In some embodiments, the baffle extends downward from the top internally facing surface between about 20% and 90% of the height of the enclosure volume. In some embodiments, the baffle extends downward from the top internally facing surface about 75% of the height of the enclosure volume.

In some embodiments, the environmental enclosure further comprises a plurality of cyclone systems. In some embodiments, a subset of air intakes of the cyclone systems are configured to close in response to a threshold gage air pressure being detected in the enclosure volume. In some embodiments, the air intake of the cyclone system is disposed substantially horizontally. In some embodiments, the first conical outlet and second conical outlet are positioned substantially normal thereto. In some embodiments, the air intake of the cyclones system is disposed between about 5% and 50% below the height of the enclosure volume as measured from the top internally facing surface. In some embodiments, the air intake of the cyclones system is disposed at most at about 25% below the height of the enclosure volume as measured from the top internally facing surface. In some embodiments, the environmental enclosure includes a contamination collection vessel that is removable from the enclosure volume.

Some embodiments are directed to a cyclone system configured to remove contamination from a heat exchange system airflow. In some embodiments, the cyclone system comprises an air intake configured to receive an air volume flow, a cyclone generating zone configured such that air volume flow particulate contamination can travel along a cyclonic path therethrough, a first outlet configured to remove the particulate contamination flowing through the cyclone generating zone, and a second outlet configured to allow fresh air to exit the cyclone system.

In some embodiments, the air intake of the cyclone system is disposed substantially horizontally, and the first outlet is conical. In some embodiments, the second outlet extends through a conical surface of the first outlet to exit the cyclone system. In some embodiments, the air intake closes in response to a threshold gage air pressure being detected in the enclosure volume. In some embodiments, the airspeed within the cyclone generating zone is at least about 10 meters per second ("m/s"). In some embodiments, the relative airspeed between the air intake and the cyclone generating zone is adjusted appropriately. In some embodiments, the relative gage air pressure between the air intake and the cyclone generating zone is adjusted appropriately.

Some embodiments are directed to a method of making a modular enclosure. In some embodiments, the method includes disposing a base container having a material cavity at a worksite, disposing a support column within the base container configured to support a spar, the support column extending to at least a height of the base, and disposing site-based material within the base container. In some embodiments, disposing the base container comprises placing a base container comprising a polymer material. In some embodiments, the disposing the base container includes placing a base container having a material cavity defined by a substantially planar bottom surface, and a plurality of sidewalls extending vertically therefrom. In some embodiments, disposing the site-based material comprises depositing site-based material selected from sand, rocks, and soil, and the site-based material sufficiently fills the material cavity volume to secure the modular enclosure in place.

In some embodiments, the method comprises removing site-based material from the worksite creating a material void. In some embodiments, the base container is disposed or otherwise positioned within the material void.

In some embodiments, the method comprises placing an environmental enclosure on one of the support column or the spar. In some embodiments, the support column is connected to a sidewall of the base container.

In some embodiments, the method comprises positioning an array of support columns at peripheral points within the base container, positioning a first spar relative to a first set of columns, the first spar being disposed in a first direction, and positioning a second spar relative to a second set of columns, the second spar being disposed in a second direction. In some embodiments, the first direction is different from the second direction.

Some embodiments are directed to a cathodic protection (CP) system comprising at least one processor coupled to memory storing instructions that, when executed, cause the at least one processor to determine a length of a pipeline to be protected, determine a state of corrosion of the pipeline to be protected, determine a nominal voltage of direct current sufficient to prevent further corrosion of the pipeline to be protected, within a predetermined corrosion tolerance, and maintain the nominal voltage of the direct current within a predetermined voltage tolerance, for example.

In some embodiments, the CP system can further comprise a central control unit configured to control one or more CP controllers remotely, for example. Additional embodiments of the CP system can include one or more CP controllers configured to operate in a switched-mode topology. The CP system can be configured to adjust the nominal voltage of direct current from 100V to 0V and from 0V to 100V, across one or more CP controllers, in other embodiments.

Further embodiments of the CP system can detect a fault in the pipeline, determine a location of the fault in the pipeline, determine that the fault is a result of at least one of an electrode failure or the corrosion in the pipeline, send a notification of the fault, and increase the nominal voltage of the direct current supplied by the at least one electrode nearest to the location of the fault in the pipeline.

Some embodiments are directed to methods for intelligent automated management of a cleaning system for optical elements in a solar power generation system. Such methods can include steps of determining, using at least one processor, a present total capacity of photovoltaic power generation of a system; determining, using the at least one processor, a present actual power measurement of the system; calculating, using the at least one processor, a difference between the present total capacity and the present actual power measurement of the system; determining, using the at least one processor, that the difference exceeds a threshold value; issuing, using the at least one processor, a first command in response to the determining that the difference exceeds the threshold value; and initiating, upon receipt of a second command from the at least one processor or another processor, an automated cleansing process with respect to at least one photovoltaic cell of the system.

In some embodiments, additional steps can be performed, including electrostatically polarizing an electrode adjacent to the at least one photovoltaic cell, electromechanically engaging an irrigation mechanism adjacent to the at least one photovoltaic cell, electromechanically reorienting or repositioning the at least one photovoltaic cell with respect to a fluid current, electromechanically reorienting or repositioning the at least one photovoltaic cell with respect to gravitational acceleration, and/or electromechanically reorienting or repositioning the at least one photovoltaic cell with respect to a shelter structure.

Other systems, methods, features and advantages of the embodiments disclosed herein will be, or will become, apparent to one with skill in the art upon examination of the following figures and detailed description. It is intended that all such additional systems, methods, features and advantages be included within this description, be within the scope of the embodiments disclosed herein, and be protected by the following claims.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION OF THE INVENTION

Figure 1:
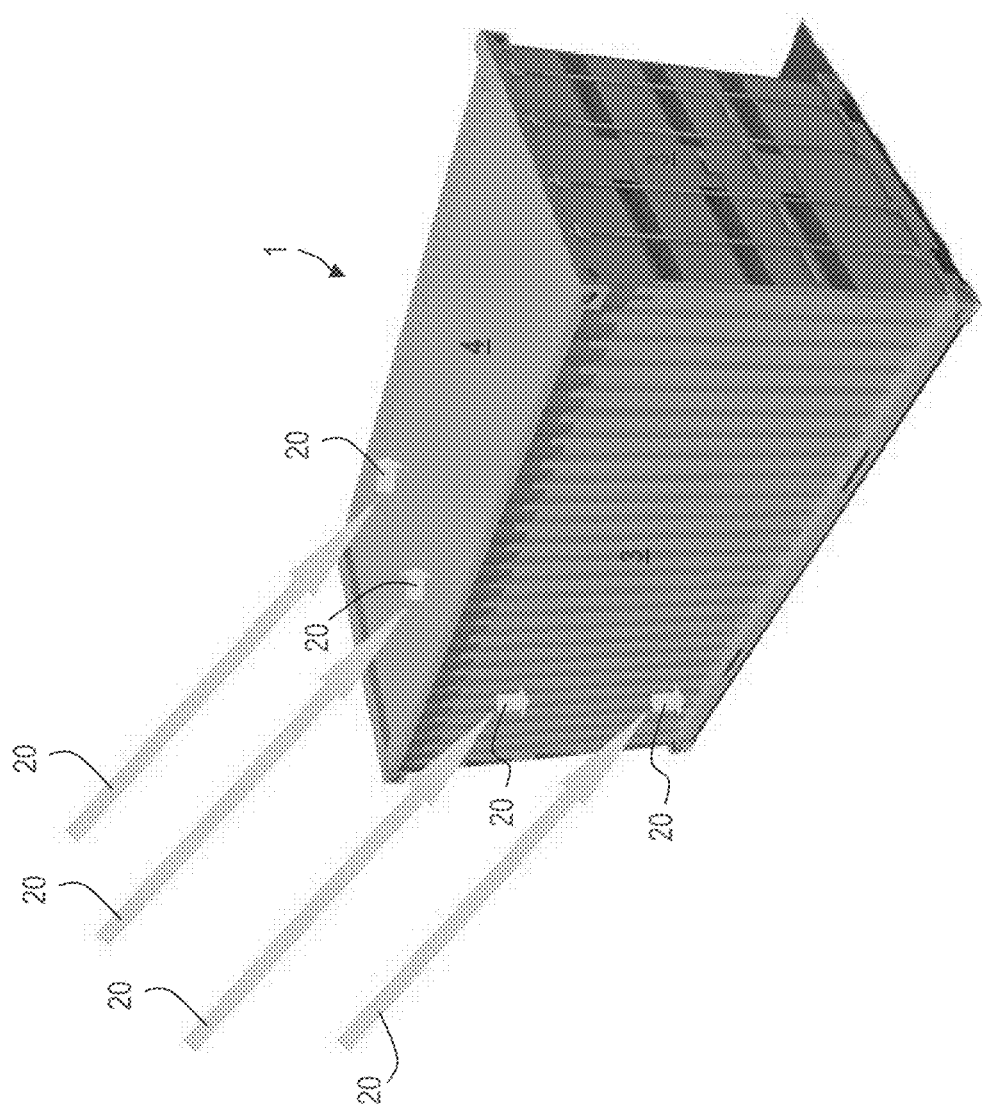
FIG. 1 is a perspective view of a conventional environmental enclosure.

Embodiments of systems, methods, and devices for remote power, generation storage, and management addresses the significant challenge for extreme environments where this type of power conversion and storage is useful, such as oilfields in the Middle East, Africa, or arctic regions, for example. Environmental enclosures described herein insulate sensitive electronic components batteries from the harsh outdoor environments, such as, extreme heat, extreme cold, dust and debris, windstorms, etc. Balancing thermal management, system cleanliness, and power efficiency are addressed by embodiments discussed herein. Additionally, safety and security, both of operations staff in the underlying components within the enclosure are increased some of the described embodiments.

As described above, due to the presence of extractable natural resources across the unpopulated area a wide range of supporting infrastructure is needed, such as oil & gas, telecommunications, water, power and electricity, etc. Practically speaking, each of these types of supporting infrastructures requires electricity. In many cases, therefore, power supply using fuel based generators (e.g. Diesel generators) running nonstop, or autonomous power systems based on solar energy and battery back-up.

Historically, however challenges including thermal management, air filtering, risk of death due to remote location, high operating expenses, high installation costs, low overall efficiency, have all been barriers to effective usage of such autonomous power systems. For example, in the desert, extreme temperatures during the summer may reach up to 55° C. This results in cooling problems for various equipment, such as batteries. Air filtration is also a challenge, due to regular intensive sandstorms, which cause air filtering and photovoltaic ("PV") generation problems. The extreme environment with excessive stress on all components, especially electrical components that may be sensitive electronics.

Additionally, due to the remote location and challenge to provide adequate security, expensive or otherwise valuable components of such power systems may be particularly vulnerable to theft, or damage. In this way, theft deterrent systems, camouflaging, autonomous remote monitoring systems, etc., reduce risk of losing capital investment.

Moreover, traditionally the high operational expenses are barrier to entry for some systems. For example, in prior systems battery exchange may be on an accelerated schedule such as once every two years. This relatively high rate of replacement is in part due to the exposure to high operational temperatures. Typical batteries used in our operations are designed to operate at an appropriate operational temperature of 25° C. Every 10° C. increase over an absolute operating temperature 25° C. reduces effective battery life twice. And relatedly, stolen batteries must be replaced unit outside of the normal replacement window. Indeed, embodiments disclosed herein extend the life of such batteries by about 800%. For additional information about battery longevity, see, for example, U.S. patent application Ser. No. 16/196,906, filed Nov. 20, 2018, which is incorporated in its entirety herein.

High operational expenses are not limited just a hardware replacement. For example, regular maintenance is required to clean PV modules that have been contaminated by the environment. This requires the personnel to travel to the site and visually inspect, and clean PV modules. Regular visits are required, and generally personnel do not know whether cleaning is required and thus may waste time and money traveling to remote site. On the other hand, if too long passes between cleanings, cleaning complexity may increase, as well as the PV efficiency decreasing. Similar scheduling challenges are applicable to air filter replacement. Use of diesel generators in some cases as an alternative to PV and storage (e.g., battery storage) is also expensive.

With respect to installation costs, for example in a desert environment that typically is a need for heavy and expensive concrete foundations for both the enclosure/shelter and PV system support construction. Construction does a complicated in that it requires providing for massive road stabilization for delivering the concrete foundations thought the desert to the site, generally provides a need for a massive road stabilization on site for the crane erecting and installation of the concrete blocks and the shelter, not to mention the high cost for renting/using the heavy equipment. And once up and running, some systems may suffer from overall lower efficiency due to the use of unfamiliar power conversion equipment and lack of total overall remote monitoring and control capabilities The embodiments described herein address these concerns and others.

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this embodiments disclosed herein can also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

As used herein, ranges are inclusive of endpoints.

As used herein, "substantially," and "about," when used in combination with ranges, are used to include variation of around +/−5% of the recited value.

Cooling—Solar Shields

Turning to FIG. 1, container 1 is shown. As shown in figure, container one shown environment with a schematic sunrays 20 impinging upon the top wall 4 and sidewalls 3 of container 1. Prior systems such as container 1 are exposed to the elements, including radiation and heat from the sun, stress and wear from dust and sandstorms. In this way, improvements are required for them to be a viable option the house sensitive electronic components, batteries, power generation, power storage, and other critical infrastructure in such environments.

Figure 2:
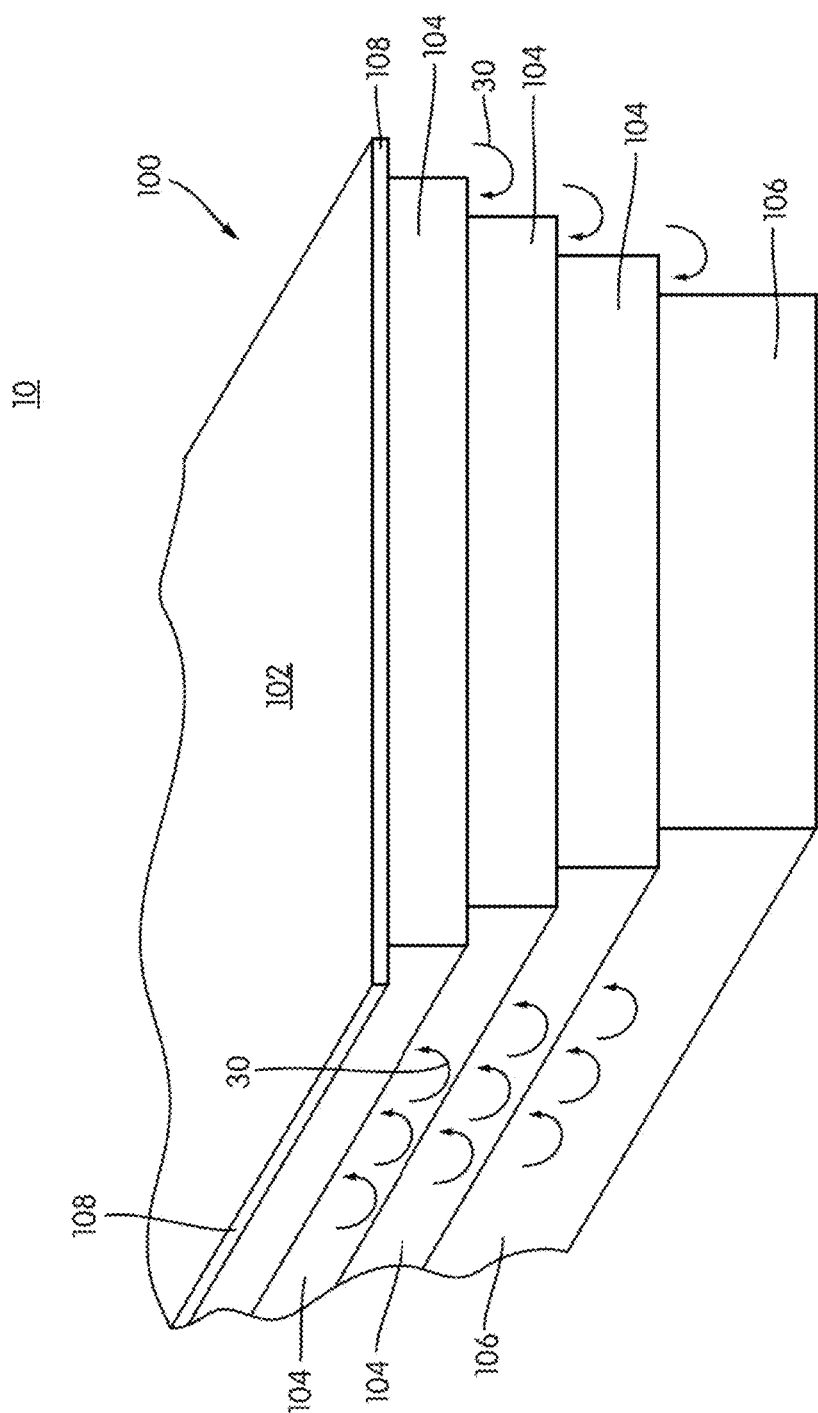
FIG. 2 is a partial perspective view of an environmental enclosure according to an embodiment.

Sun beams hit the surface of the container 1 directly, thus leading to immense heating of the whole container. The overheating leads to vast shortening of the battery life, as well as the life span of all electronics and materials involved in the construction. This also contributes to high operating expenses ("OPEX") due to the frequent replacement of components, transportation, shipping, maintenance, man hours, etc. Without such protection, it is more likely for the equipment to overheat. Indeed, in general, the rougher and darker a surface is, the more heat it absorbs. Most standard container solutions have wrinkled metal sheet walls. These types of walls do not reflect the sun beams, instead they absorb them. Almost all of the emitted energy by the sun that makes contact with the container's surface is absorbed, thus leading to immense heating. The walls are completely enclosed and have no air circulation in the walls. The environmental enclosure shown in FIGS. 2-4 solves these issues.

As shown in FIGS., system 10 is shown. In some embodiments, system 10 can include an enclosure 100. Some embodiments, enclosure 100 includes a top solar shield 102, one or more side solar shield 104, and one or more lower solar shield 106. In some embodiments, one or more of top solar shield 102, side solar shield 104, or lower solar shield 106 are constructed as solar shields. Utilizing solar shields protect the inside of the enclosure 100 from the solar radiation emitted from the sun, during the day. In some embodiments, the solar shields are constructed using a highly reflective, mirror surface. In this way, solar shields reflect the rays of the sun throughout the day.

Moreover, the solar shields not only reflect the sun beams throughout the day, but also create shade, which is very important. In some embodiments, the solar shields are constructed to have a large temperature resistance. In this way, only a very small amount of heat can pass through the material, because of its relatively large thermal resistance.

Thermal resistance is a heat property and a measurement of a temperature difference by which an object or material resists a heat flow. Thermal resistance is the reciprocal of thermal conductance. Thermal resistance (e.g., absolute thermal resistance) "R" in Kelvin per Watt (K/W) is a property of a particular component. By selecting materials with large thermal resistance, the inside enclosure 100 can be designed to achieve appropriate ambient interior temperature. Utilizing solar shields that are specially positioned to ensure proper cooling of the protective surface as well as protection from the sun beams and emitted radiation increases the lifespan of all materials, electronics, and the batteries. This solution obtains a very large OPEX cost reduction.

Another benefit of using highly reflective surfaces for walls 102, 104, 106 is that the entire enclosure 100 effectively camouflaged from the outside, including from aerial views. This makes it less likely that enclosure 100 will be targeted for damage sabotage, or theft of components, such as large and valuable batteries that serve as energy storage. This too, and save on OPEX cost in the long run, and expensive equipment does not need to be replaced as often. Reflecting solar shields, when seen from a long-distance, render the enclosure 100, i.e. shelter, optically invisible in the desert. In some embodiments, a hidden door may be provided (see FIG. 10, "SO"), preventing the recognition when approaching enclosure 100. In some embodiments, no door handles are provided and hidden locks, e.g. electromagnetic or server locks may be used on the inside of the door. In some embodiments remote or wireless lock control such as RFID, wireless card, or GSM/remote control may be used to lock and unlock enclosure 100.

Remote monitoring of the site is also contemplated, including cameras, 3D cameras, ultra-sonic sensors, proximity sensors, thermal cameras, image processing algorithms, etc. In this way, remote monitoring can increase security to the remote location. Moreover, remote monitoring of PV modules allows for decreased or optimized visits to clean the PV modules to maintain sufficient efficiency.

As shown, environmental enclosure 100 includes sidewalls defining an enclosure volume. Each of the sidewalls has an internally facing surface and an externally facing surface, and a solar shield comprising a reflective surface. As shown in the figures, the side solar shields 104/106 are spaced a first distance externally from the enclosure volume and connected to a sidewall, the first distance defining a portion of a flow area, where airflow 30 is shown. In some embodiments, the flow area is configured to produce stack effect draft such that airflow 30 naturally is drafted between the solar shield and the sidewall of the enclosure 100. In some embodiments, the environmental enclosure includes a battery 501 within the enclosure volume comprising at least one of a lead-acid battery, lithium-ion battery, sodium-ion battery, potassium-ion battery, nickel-based battery, polymer-based battery, polysulfide bromide battery, silver-oxide battery, metal-air silicon-air battery, glass battery, organic radical battery, and rechargeable fuel cell. These components are typically the most expensive component for the infrastructure environmental housing.

With reference to the stack effect draft, in some embodiments, the stack effect draft is proportional to one of the flow area and the square root of an effective height of the solar shield. As used herein, "flow area" is used to denote an area of flow, e.g., airflow. As used herein, "effective height" is used to denote an effective height or length of a surface, which is configured to achieve a particular stack effect draft. In some embodiments, the environmental enclosure 100 includes a solar shield 102 disposed on a roof of the environmental enclosure, the stack effect draft is directed between the solar shield disposed on a roof of the environmental enclosure and the roof of the environmental enclosure. In some embodiments, the solar shield 102/104/106 has a solar reflectance index configured to optimize reflectance. In some embodiments, the solar shield is substantially planar along the area of the wall, and is positioned substantially parallel thereto.

Figure 3:
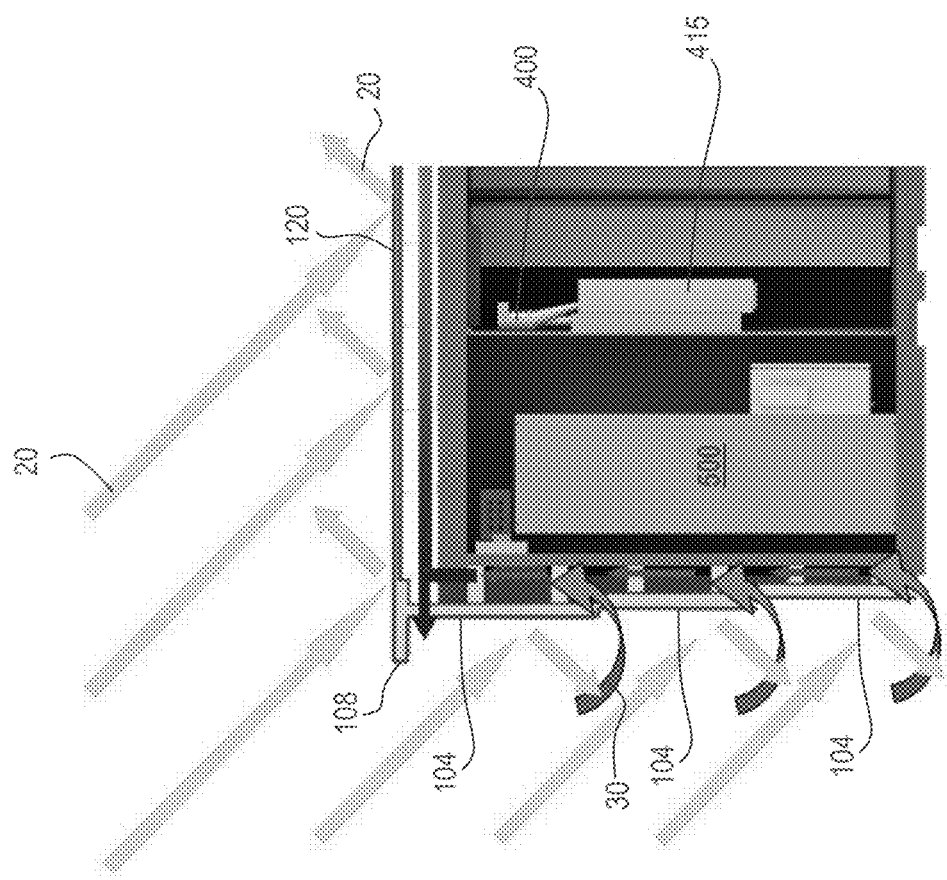
FIG. 3 is a partial sectional view of the environmental enclosure shown in FIG. 2.
Figure 4:
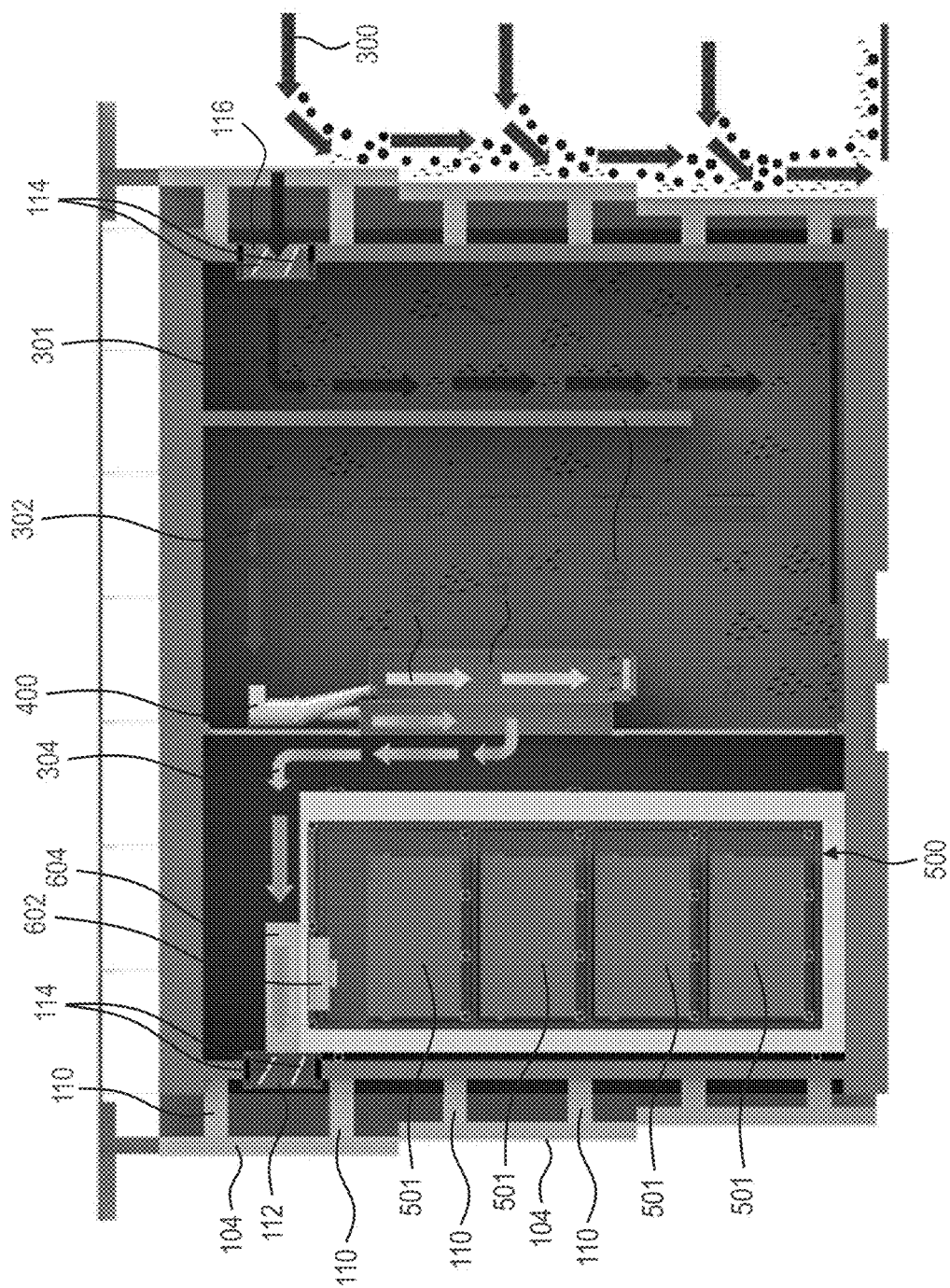
FIG. 4 is a partial sectional view of the environmental enclosure shown in FIG. 2.

As shown in FIGS. 3 and 4, for example, environmental enclosure 100 includes a second solar shield 106 comprising a reflective surface. Second solar shield 106 is spaced a second distance externally from the enclosure volume different from the first distance. Similar to solar shield 104, the second solar shield 106 is connected to a sidewall, the second distance defining a portion of a second flow area. Again, is similar to configuration of solar shield 104, the second flow area is configured to produce stack effect draft. In some embodiments, the second distance is greater than the first distance or less than the first distance. In general, moving from the ground upwards, each successive solar shield is disposed further way from the wall of enclosure/container. In this way, multiple airflows 30 can be disposed vertically along entire surface of the sidewall of the enclosure/container, and each may provide an optimized stack effect draft.

In some embodiments, top solar shield 102 can include a flange portion 108, which extends past the uppermost solar shield 104, and which may be disposed above the roof of the enclosure/container such that an additional stack effect draft and airflow 30 can be provided between the roof of enclosure/container and the top solar shield 102.

Turning to FIG. 4, in some embodiments, the environmental enclosure 100 includes a battery chamber 500 within the enclosure volume configured to house a battery 501. Some embodiments multiple batteries 501 are used in an array. In some embodiments, the battery chamber 500 includes insulated chamber sidewalls defining a chamber volume, with a chamber top wall enclosing the chamber volume. In some embodiments, a heat exchange system (see FIGS. 7 and 8) is configured to maintain the chamber between about 15° C. and 30° C. In some embodiments, the insulated chamber sidewalls have an R-value specified to maintain a specific temperature differential.

Air Filtration System

Prior systems that house our generation storage equipment such as batteries 501, struggled to rely on traditional air filtration systems, e.g., systems and physical filters that need to be cleaned, and/or replaced with regularity. As described above, the extreme environment of the desert and other remote locations The purpose of using air-filtering system without any filters is to clean the air from any potentially harmful particles, which can cause faults in the electronics, for example by fouling some cooling components, or simply decreasing the efficiency of the system. Indeed, in many cooling systems, fans can be an important part of the cooling process of the equipment. That is, they require certain cleanness of the environment in which they work. If the fans are working in a much polluted environment, cleaning of the air is needed in order has guarantee for proper working of the electronics without any problems. Particles with size over a particular threshold level can cause inefficiency, or failure of the fans or of the equipment. Additionally, because the particles in the air can be conductive or electrostatically charged, they may stick to surfaces within the enclosure be difficult to remove or adjust for.

Turning to FIGS. 3 and 4, enclosure 100 is configured such that airflow 30 must travel relatively long way from the entrance to enclosure 100 to the cooling system. In some embodiments, enclosure includes a cyclone air filtering system 400. The distance and pathway from the inlet to enclosure 100 to cyclone air filtering system 400 is also configured such that particulates are removed from airflow.

With reference to FIG. 4 at the right side of the figure, the first step in the air cleaning process is the airflow path 300 impacts solar shields 104/106. With this impact, the largest particles not enter into enclosure 100 at all. However, the airflow is only clean of the largest particles at this stage. As the airflow is drawn by the stack effect draft, it may pass through inlet 116, if dampers 114 are open. The airflow then follows generally airflow path 301.

As shown in figures, airflow path 301 next and is upon baffle 118 as the first obstacle within the enclosure 100. As the airflow travels along general airflow path 301 other larger particles 310 precipitates out of airflow and settle on the bottom of the enclosure 100. As is apparent from FIGS., the airflows progressively cleaner moves through enclosure. General airflow past 302 is shown traveling generally upward and precipitating out articles 312. Airflow path 30 to lead the airflow into the cyclone air filtration system 400, towards the top of enclosure 100. As the airflow enters cyclone air filtration system 400 partial cutaway view shows internal airflow path 303 precipitation of the relatively fine particles 314 and the floor of enclosure 100.

As shown, airflow path 304 is introduced into an area prior to battery enclosure 500. The airflow path 304 has been cleaned, without using any membrane filters, etc., to degree that is acceptable to be used, along heat sink 604. In some embodiments, airflow path 304 does not enter battery chamber 500. Rather, battery chamber 500 is sealed, using an internal fan 602 to circulate isolated airflow within the chamber. In some embodiments, battery chamber 500 can be open, and may introduce airflow path 304.

Baffle 118 can be disposed at the top of enclosure 100, for example mounted to the ceiling. In some embodiments, additional baffles 118 can be used, either with the same size or different sizes, symmetrical or asymmetrical spacing, and in various configurations. In some embodiments, baffle 118 can be disposed at the bottom of enclosure 100, for example extending upwards from the floor, or in some embodiments extending outwardly from the internal side enclosure 100. In some embodiments, baffle 118 can be omitted.

Environmental enclosure 100 again includes sidewalls defining an enclosure volume. Each of the sidewalls having an internally facing surface and an externally facing surface. In some embodiments, the environmental enclosure 100 includes a variable air intake 116 disposed in a sidewall of the enclosure defining an air inlet for an airflow path. Baffle 118 extends from a top internally facing surface towards a lower internally facing surface. Some embodiments, baffle 118 can extend substantially vertically. In other embodiments, baffle 118 can be disposed at an angle relative to vertical. In embodiments using plural baffles 118, combination of substantially vertical or vertically offset baffles 118 is contemplated.

Baffle 118 is configured such that a first portion of air contamination is directed to the floor of the enclosure volume. In some embodiments, cyclone system 400 is disposed downstream of baffle 118. Baffle 118 can direct airflow 301 straight down to the bottom of enclosure/container 200. In some embodiments, relatively large particulates 310 can precipitate without contacting baffle 118. Relatively large particulates 310 can then fall to the floor. In some embodiments, the baffle extends downward from the top internally facing surface between about 20% and 90% of the height of the enclosure volume.

As airflow path 301 reaches the bottom of enclosure 100, another large amount of relatively large particles precipitates, and the airflow speed may be reduced significantly. As airflow continues, it is directed upwards along airflow path 302. As a travels upward, only the finest particles are able to follow airflow path 302 upwards, because the rest are too heavy. As the airflow travels, the airflow speed is slowed, appropriate speed to enter cyclone system 400. The volume of enclosure 100 can be selected such that it is sufficiently large to slow the airflow speed down appropriately for the entrance into cyclone system 400. In doing so, that ensures that there is enough time for the air to be appropriately cleaned and filtered.

Once processed through cyclone system 400, airflow continues along airflow path 304 and into the battery in system compartments. In some embodiments a fan is installed and one or more of these compartments. An array of fans may also be provided. In this way the stands may provide movement of air within enclosure 100. Air may travel generally from inlet 116 (e.g. variable air intake 116) along the various airflow path, and out outlet 112. Airflow is controlled such that air enters into the compartments through the cyclone system 400. In some embodiments, this is controlled by measuring the pressure within the compartment, and adjusting, for example dampers 114 or the speed of the fan.

In some embodiments, the variable air intake 116 is disposed behind a solar shield 104 connected, for example by member 110 to the externally facing surface of a sidewall. In some embodiments, the variable air intake 116 is configured to open in response to a first gage air pressure threshold. In some embodiments, the first gage air pressure threshold is measured at a location selected from within the battery chamber 500, within the enclosure volume, or external to the enclosure volume. In some embodiments, the variable air intake 116 is configured to close in response to a second gage air pressure threshold. In some embodiments, the second gage air pressure threshold is measured at a location selected from within the battery chamber 500, within the enclosure volume, or external to the enclosure volume.

In this way, for example, if the environmental conditions are very harsh such as a sandstorm, the variable air intake 116 can be configured to automatically adjust or close completely dampers 114. Dampers 114 serve as automatic ventilation shutters. In some embodiments, dampers 114 are controlled by a microcontroller unit (MCU) of the system. For additional information, see, for example, U.S. patent application Ser. No. 15/385,627, filed Dec. 20, 2016, and U.S. Pat. No. 9,965,016, each incorporated in its entirety herein.

In some embodiments, a plurality of sensors is used to take different types of measurements (e.g., temperatures, pressures, airspeed, humidity, electrostatic measurements, voltage or current measurements, etc.). An algorithm then decides whether the dampers 114 are open and the fans are running, or not. In this regard, the entire enclosure 100 protected from the polluted air outside, in case of a sandstorm or in case of significant increase of the wind speed. During a sandstorm the windspeed increases significantly, and it is possible for trash to enter enclosure 100 is intake 116 is not closed. Additionally particulates that have already precipitated on the floor of the enclosure 100 can be lifted and blown around the interior. A windspeed sensor may be provided, and a controller may control the system based on a programmable threshold. This threshold can be adjusted in accordance to the environment, in order to ensure proper operation of the shutters in case of a sandstorm or other environmental event.

In some embodiments, the environmental enclosure 100 includes a fan 602 disposed within the battery chamber 500 configured to provide a suction pressure to introduce clean air into the battery chamber. In some embodiments, the fan 602 is configured to be put into an off-state in response to the variable air intake 116 being closed. In some embodiments, the environmental enclosure 100 includes a cleaning system configured to automatically remove the first portion of air contamination from the enclosure volume. The system may include for example a static system vibration system long lower portion of the interior sidewalls or floor of enclosure 100. The system may also include, for example an automated brush system or trapdoor, for example.

In this way, remote cleaning and maintenance may be possible, thus further reducing operating expenses. Indeed, when the amount of the particles reaches a certain level (e.g., volume, height from the floor, etc.) as measured by a sensor, the MCU can provide a signal for opening the door. When the door is opened the precipitated particles fall off from the enclosure 100. The motive force may include, for example ultrasonic energy. In some embodiments, battery chamber 500 can also have trapdoor that functions the same way. In this way, battery chamber 500 can be cleaned automatically such that the particulates inside battery chamber 500 can be moved to the bottom of enclosure 100. Inside floor of enclosure 100 also can have a self-cleaning function. In addition or substitute to ultrasonic systems, the self-cleaning motive force may include, for example brushes, movable barriers, electrostatic, etc.

Air Filtration—Cyclone System

In some embodiments, the environmental enclosure further includes a plurality of cyclone systems 400. In some embodiments, a subset of air intakes of the cyclone systems 400 are configured to close in response to a threshold gage air pressure being detected in the enclosure volume.

Figure 5:
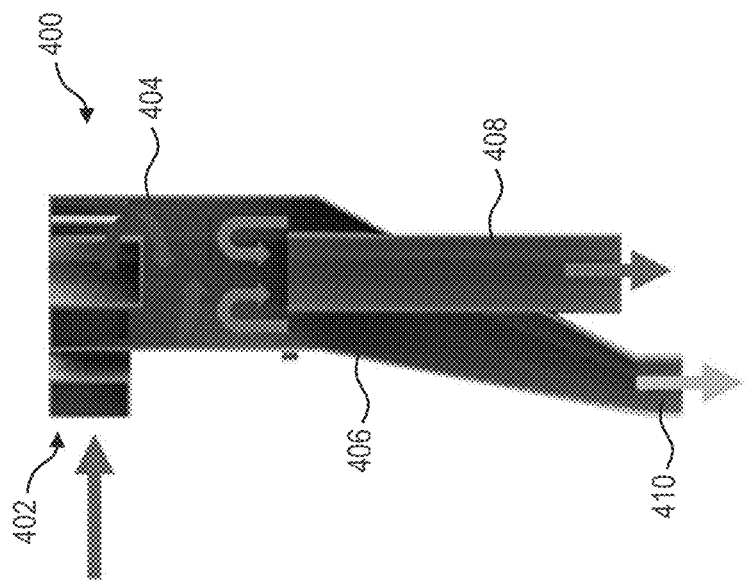
FIG. 5 is a partial sectional view of a cyclone system according to an embodiment.

Turning to FIG. 5, an exemplary cyclone system 400 is shown. In some embodiments, the air intake 402 of the cyclone system 400 is disposed substantially horizontally. In some embodiments, a first outlet 410 is positioned substantially normal to air intake 402. In some embodiments, a second outlet is provided, and may be positioned substantially normal to air intake 402. In some embodiments first outlet 410 can be conical. Air intake 402 of the cyclone system is disposed at most at about 25% below the height of the enclosure volume as measured from the top internally facing surface, in some embodiments. Air intake 402 of the cyclone system is disposed between about 5% and 50% below the height of the enclosure volume as measured from the top internally facing surface, in some embodiments In some embodiments, the environmental enclosure 100 includes a contamination collection vessel that is removable from the enclosure volume.

Cyclone system 400 can intake air through air intake 402 port and through the cylindrical portion 404 and into cyclone generating portion 406, which can be configured as a conical portion. In this way, the cyclone system 400 is used to separate the very fine particulate, such as sand particles, from the clean air. As the airflow that includes the very fine particulate enters here intake 402 port the airflow is routed in a rotational flow path due to the funnel shape of the main body of the cyclone system 400, between cylindrical portion 404 and the function of conical portion 406. As the airflow rotates, the centrifugal and/or centripetal force accelerates the last remaining very fine particulate. Particulates begin to rotate relatively close to the walls on the interior of the cyclone system 400, and as they reach the cone shaped portion 406 that becomes narrower and narrower moving downward, particulates are accelerated further and exit cyclone system 400 through outlet 410. In some embodiments, a collection means may be provided to collect particulates the exit through outlet 410.

In some embodiments, fresh airflow exits through outlet 408, for instance into battery chamber 500, or into the portion of enclosure 400 and isolated and contained battery chamber 500. In some embodiments, outlet 408 can include a screening or filter, or other collection means configured to collect any particulates that for any reason do not exit through outlet 410. In some embodiments, outlet 408 is configured as a tube that intersects extends through conical portion 406. In some embodiments conical portion 406 can be formed semi-conically. In some embodiments, the cyclone generated within the airflow inside cyclone system 400 can be configured such that when generated the center of the cyclone aligns with the interior opening of outlet 408 such that clean airflow is pulled directly from center of the cyclone within cyclone system 400. In some embodiments, air intake 402 is configured to receive an air volume having a second portion of air contamination. In some embodiments, the conical portion 406 is configured as a cyclone generating zone.

In some embodiments, cyclone system 400 is configured to remove contamination from heat exchange system 600 airflow 802. (See, e.g., FIGS. 7 and 8.) In some embodiments, air volume flow particulate contamination can travel along a cyclonic path through cyclone system 400. As described above, a first news outlet configured to remove the particulate contamination flowing through the cyclone generating zone, and a second outlet is configured to allow fresh air to exit the cyclone system.

In some embodiments, the air intake 402 of the cyclone system 400 is disposed substantially horizontally, and the first outlet 410 is conical or at least connected to conical portion 406. In some embodiments, the second outlet 408 extends through a conical surface of the first outlet for 10 or conical portion 406 to exit the cyclone system. In some embodiments, the air intake 402 closes in response to a threshold gage air pressure being detected in the enclosure volume. In some embodiments, the airspeed within the cyclone generating zone 406 is In some embodiments, the airspeed within the cyclone generating zone is at least about 10 meters per second ("m/s"). In some embodiments, the relative airspeed between the air intake and the cyclone generating zone 406 is calibrated accordingly, such as to a predetermined ratio, for example. In some embodiments, the relative gage air pressure between the air intake 402 port and the cyclone generating zone 406 is calibrated accordingly to a predetermined ratio.

In some embodiments, multiple cyclone systems 400 can be provided within enclosure 100. Indeed, the usable volume of clean air, e.g., for use with exchange system 600, for example, may be increased based on number of cyclone systems 400 that are provided within enclosure 100. As such, a larger number of cyclone systems 400 can increase lifespan of all equipment housed within the separate compartments, e.g., batteries, controllers, etc. As described above, cyclone generated within cyclone system 400 depends upon a particular airspeed generated inside cyclone system 400. In some embodiments, that internal airspeed may be controlled by one or more fans, for example fans pulling air through a heat sink in heat exchange system 600. Design parameters include, for example the air debit of the fans, the volume required for clean air, and placement of cyclone systems 400.

Figure 6:
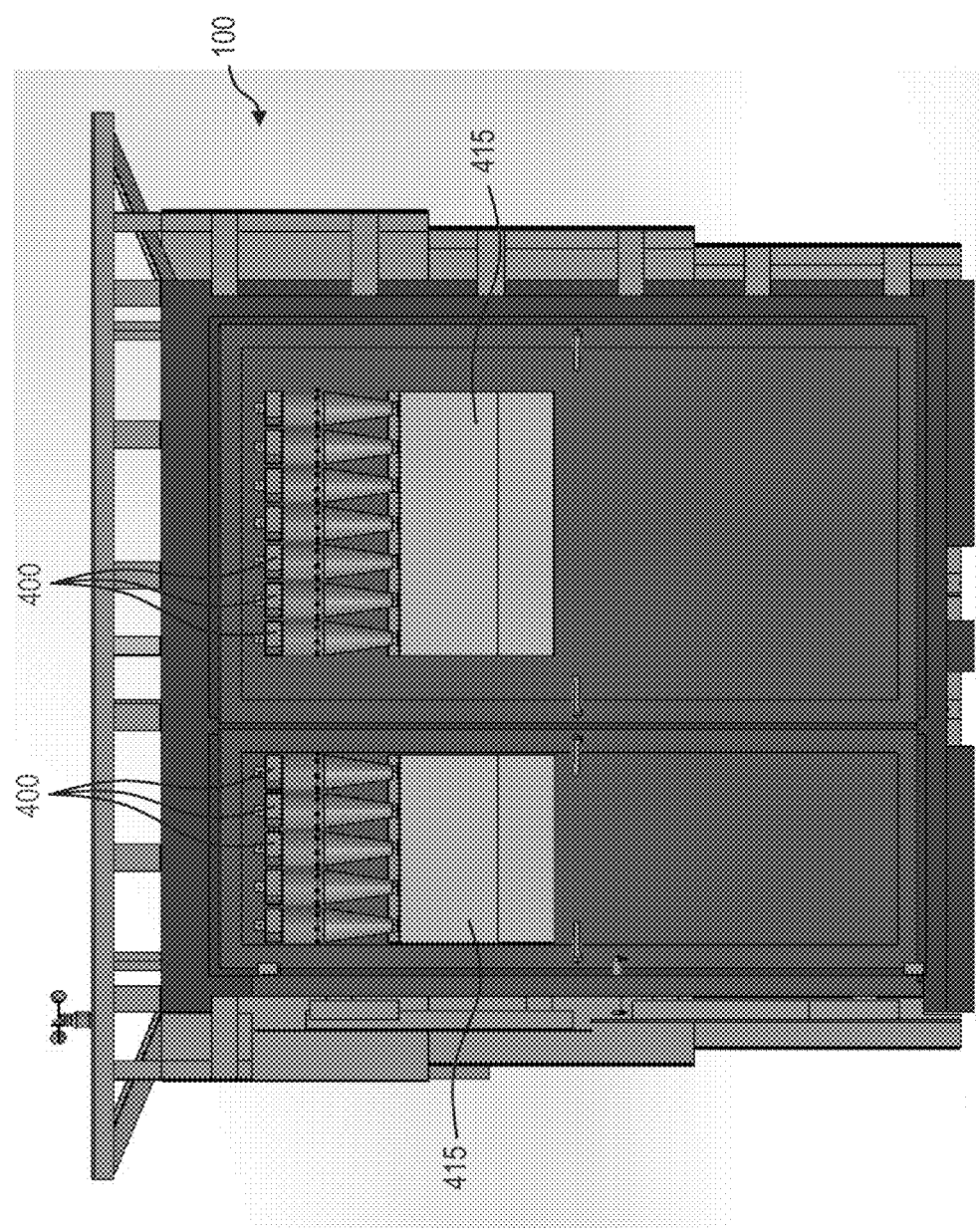
FIG. 6 a partial sectional view of an environmental enclosure including a cyclone system according to an embodiment.

In some embodiments, cyclone systems 400 are mounted in such way that the air intake 402 is positioned relatively high within enclosure 100. In this way, air intake 402 is positioned high, such that the airflow path prior to air intake 402 sufficiently long such that larger particulates are not able to reach air intake 402 of cyclone system 400. As shown in FIG. 6, one or more arrays of cyclone systems 400 can be coupled to particulate collection means, such as particulate containers 415. Particulate containers 415 can be configured to be automatically cleaned or removed, or simply uncoupled from cyclone system 400 to remove collected particulates a clean from airflow within cyclone system 400.

In some embodiments, cyclone system 400 can be configured such that the overall footprint of an individual cyclone system 400 can partially or wholly overlap the overall footprint of a second cyclone system 400. That is, individual cyclone systems 400 can be coupled together in a nested fashion, thereby saving space and providing an efficient air cleaning solution without the need for screens, or other membrane type filtration systems. In utilizing several cyclone systems 400, airflow is filtered and cleaned in a very efficient manner, minimizing consumption of energy due to the usage of very small fans and the cyclonic action of cyclone systems 400. As is apparent, the system removes any need for maintenance such as changing or cleaning any filters. And because of the lower power consumption, battery requirements may be calculated for smaller output. The operational expense savings for sending maintenance crews to the field for regular maintenance is also decreased. And challenging and aggressive environments in which enclosure 100 is deployed, air filtration system utilizing the labyrinth airflow path in tandem with cyclone system 400 remains a reliable way to provide for clean air within enclosure 100.

Cooling—Passive Cooling Via Semiconductors

Inside enclosure 100, and particularly inside battery chamber 500, additional cooling may be required to maintain batteries and other sensitive equipment at an appropriate ambient temperature. Active cooling, such as through a vapor compression system, suffers from efficiency losses, added complexity, and cost. More passive solutions, such as purely heat sinks without any airflow may not produce enough temperature differential such that the target ambient temperature is achieved. Embodiments disclosed herein solve these problems.

In some embodiments, heat exchange system 600 can be configured as a semi-passive cooling system, heat sinks, heat pipes, and/or Peltier elements in particular arrangements. In this way, the exchange system 600 maintains a stable temperature inside the battery chamber 500, even while enclosure 100 can be placed in the harshest desert conditions possible. As discussed above, battery chamber 500 can include insulated walls and may be completely enclosed, further preventing the outside temperature to reach inside the battery chamber 500.

A Peltier element is a semiconductor element that can act as a heater, or a cooler depending upon the voltage applied across the terminals. The element generally includes a plurality of semiconductors that are enclosed in a casing with two ceramic plates, which are insulated, e.g., by a latex compound from each other. This insulation removes the chance of having a thermal bridge between the ceramic plates, thus leading to improper operation of the Peltier element. When voltage is applied to the Peltier element one of the plates is heated, and the other is cooled down. If the hot plate is properly cooled down, that is, rejects heat, the cold plate will be able to absorb more heat due to its colder temperature and lower energy. In some embodiments, the Peltier system may be DC powered. In some embodiments, it may include a power back-up.

Heat exchange system 600 is thus optimized in terms of size and power consumption. Low power fans and Peltier elements have a very low consumption in comparison to a standard air conditioner such as a vapor compression system or a different type of cooling method. Advantageously, like the cyclone system 400, no filters are required in this system (unlike a standard vapor compression system air conditioner). The biggest advantage is that the cooler practically requires almost no maintenance. It has heat sinks, which are cleaned electrostatically. Very high voltage is used, which changes the polarity of the particles attached to the head sink. With the change of their polarity, the particles are repelled from the heat sinks' surface and blown outside by a fan.

Figure 7:
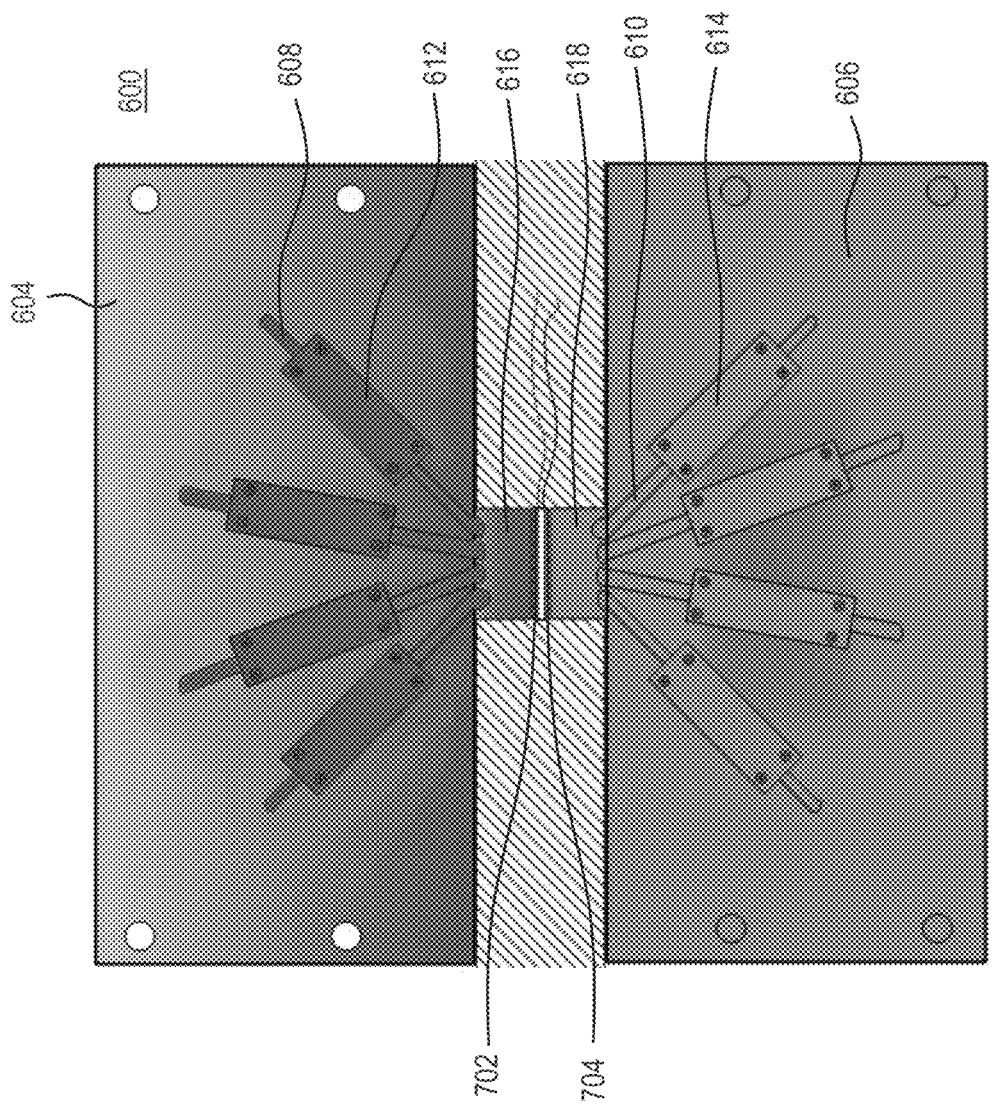
FIG. 7 is a schematic view of a heat exchange system according to an embodiment.
Figure 8:
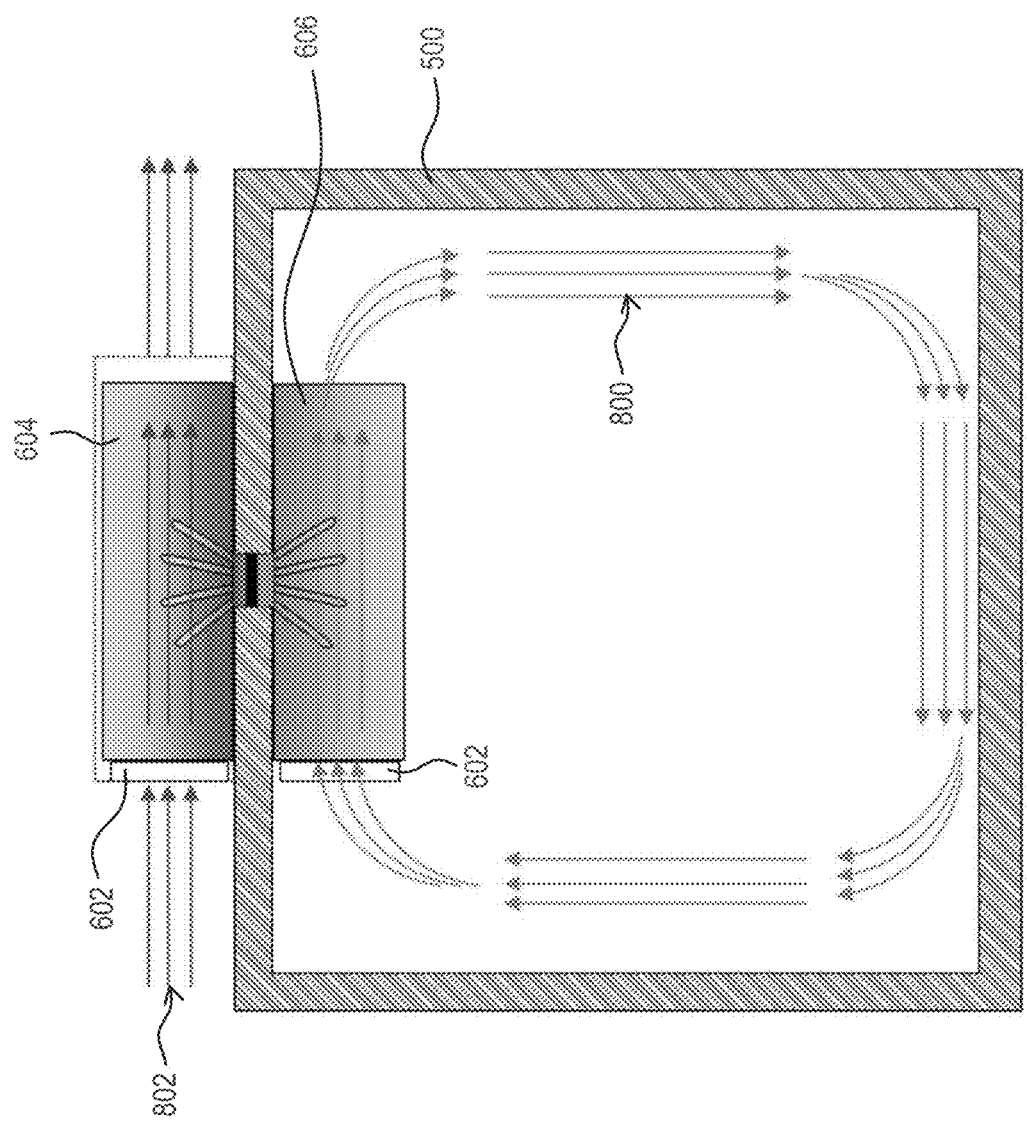
FIG. 8 is a schematic view of the heat exchange system according to an embodiment.

Turning to FIGS. 6 and 7, some embodiments, the environmental enclosure 100 includes a heat exchange system 600. In some embodiments, heat exchange system 600 includes a fan 602 disposed within battery chamber 500. In some embodiments, heat exchange system 600 includes an additional fan disposed outside battery chamber 500, downstream of cyclone system 400. In some embodiments, heat exchange system 600 does not include a vapor compression system. In some embodiments, heat exchange system 600 further includes a fan disposed within the enclosure volume and outside of the battery chamber 500 and configured to produce airflow across a heat sink 604 in thermal contact with a Peltier element.

As shown, heat sink 604 can be coupled to heat pipe 608 for example through coupling element 612. In some embodiments multiple heat pipes may be connected to the same heat sink 604, thereby increasing thermal rejection efficiency of the system. In general, heat exchange system 600 includes a heat rejection side outside of battery chamber 500, and heat absorption side within battery chamber 500. That is, within battery chamber 500, heat sink 606 absorbs heat produced by batteries 501 and other assorted components transferring that the heat pipe 610. Heat pipe 610 and heat sink 606 are coupled together coupling element 614. Heat pipes 610 are in turn mounted to base 618. Base 618 is coupled to a cold side 704 of the Peltier element, and base 616 may be coupled to hot side 702. Cold side 704 works with hot side 702 of the Peltier element in order to transfer heat from within battery chamber 500 to the exterior of battery chamber 500, thereby maintaining an appropriate ambient temperature within battery chamber 500.

In some embodiments, an appropriate voltage is applied across the Peltier element to dislodge particles attached to one or more of the heat sinks. In some embodiments, the heat exchange system 600 is configured to cool the battery chamber 500 when a temperature of the battery chamber 500 exceeds a first threshold for a first duration. In some embodiments, the heat exchange system 600 is configured to heat the battery chamber 500 when a temperature of the battery chamber 500 is below a second threshold for a second duration, such that the temperature of the battery chamber 500 is stabilized. As used herein, the discussion of temperature "stabilization" relates to controlling a temperature within a predetermined volume.

In some embodiments, the heat exchange system 600 further includes a Peltier element including hot and cold portions disposed between an inner surface of the battery chamber 500 and an outer surface of the battery chamber 500. The Peltier element is configured to selectively heat or cool the battery chamber 600. As discussed, in some embodiments, the heat exchange system 600 further includes a heat sink in thermal contact with a surface of the Peltier element and in thermal contact with a heat pipe, such that the heat sink transfers heat between the Peltier element and the heat pipe—this configuration is available at either the heat absorbing side or the heat rejecting side of the heat exchange system 600. In some embodiments, the heat exchange system further includes a heat sink in thermal contact (e.g., direct thermal contact) with a surface of the Peltier element. In some embodiments, the heat sink is disposed within the battery chamber 500. In some embodiments, the heat sink is disposed within the enclosure volume.

In some embodiments, the heat absorbing side and rejecting side may be reversed, with the reversal of the voltage polarity. This way the system can maintain a stable temperature of the battery chamber 500, and by extension the battery 501. In some embodiments, a controller controls the voltage polarity of the Peltier element based on the first temperature threshold. In some embodiments, the controller may reversed the polarity of the Peltier element based on the second temperature threshold. In some embodiments, controller monitors the actual temperature of the Peltier element itself, controls the voltage value and polarity based on this measurement.

Civil Works

Figure 9:
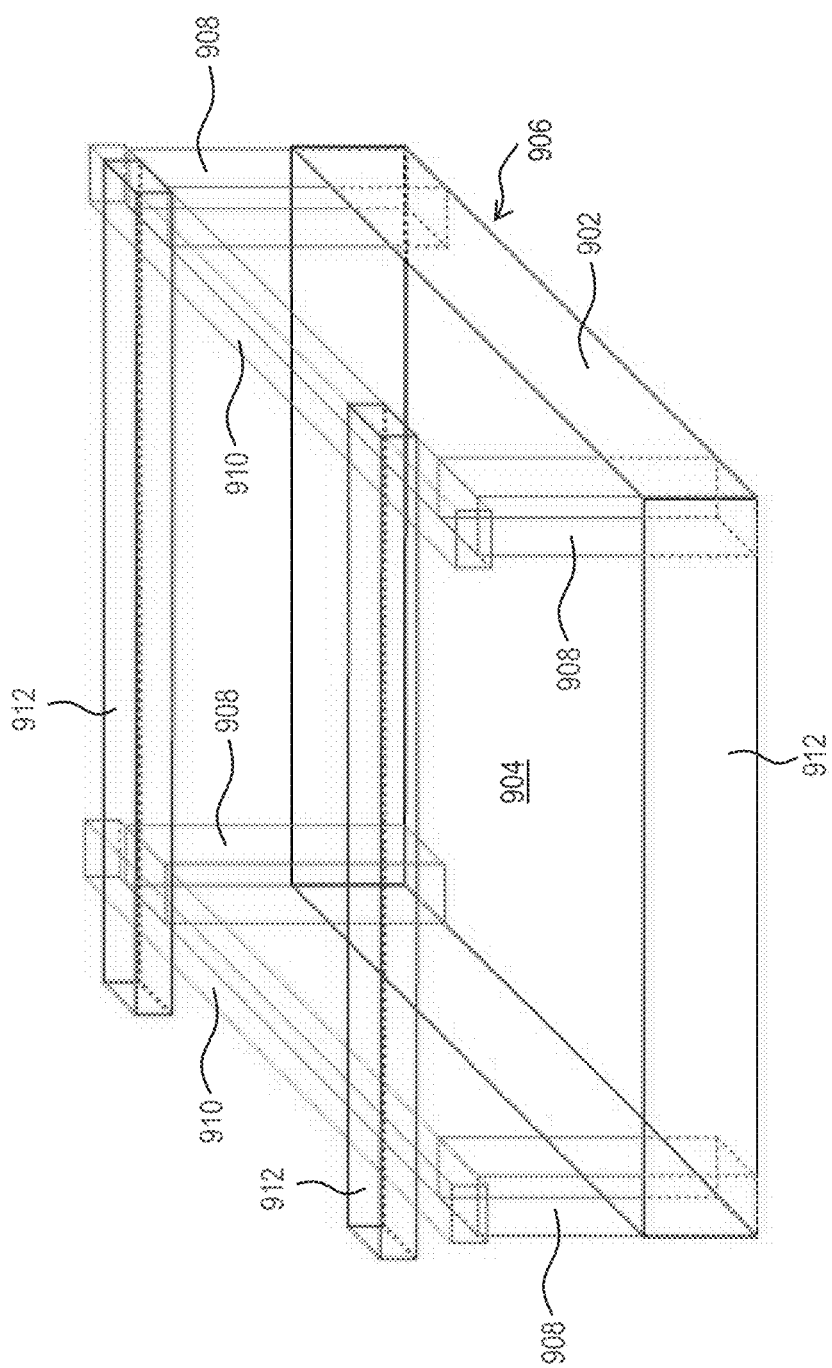
FIG. 9 illustrates a partial civil works system related to an environmental enclosure according to an embodiment.
Figure 10:
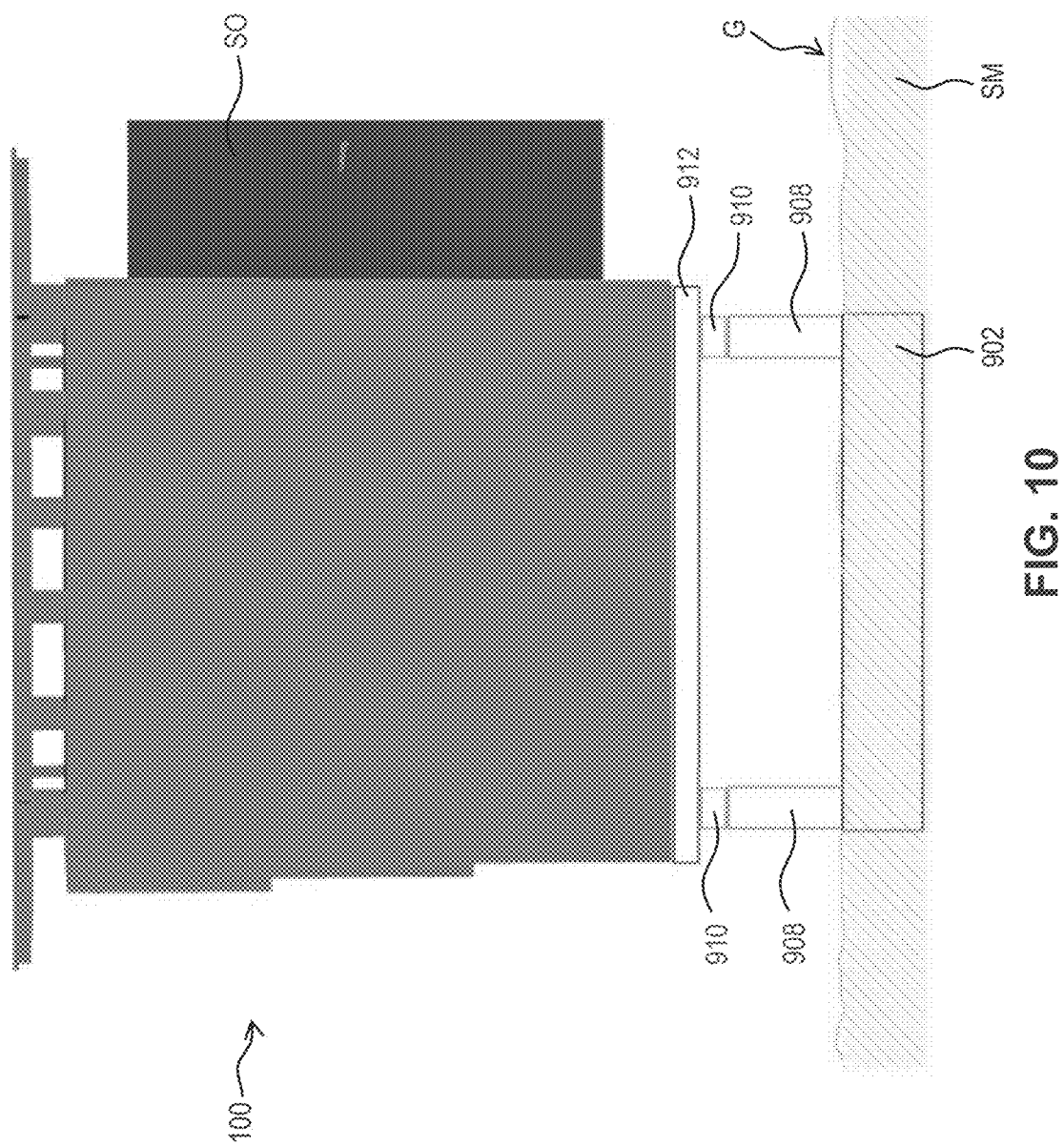
FIG. 10 illustrates an environmental enclosure according to an embodiment installed using a civil works system, as shown in FIG. 8.

Turning to FIGS. 9 and 10, the enclosure 100 base construction is described. Advantageously, base construction 900 is durable, strong, non-corrosive, and very lightweight. Site specific installation is rendered simple, and is configured to minimize the installation costs, so as to accommodate harsh weathers conditions. Particularly base 900 can include container 906 having bottom 904 sidewalls 902. Columns 908 can be placed within container 906, positioned substantially vertically, for example outside corners of the container. Container 906 can be filled with site-specific material, such as sand, soil, rocks, etc. columns 908 can support spars 910 between opposing columns 908, respectively, and spars 912 can be supported again respectively, by spars 910. In this configuration, we evenly distributed, and base construction 900 is rendered sufficiently stable.

In contrast to past and methods, no road construction is required, that is due to the lightweight configuration of base construction 900 the not require any special route through the desert, such as the temporary road. Additionally, no concrete footing is required, no difficult so works are required, and the entire base construction may be deposited at the site using a small truck.

Some embodiments are directed to a method of making a modular enclosure. In some embodiments, the method includes placing a base container 906 having a material cavity at a worksite, placing a support column 908 within the base container 906 configured to support a spar 908. In some embodiments, the support column 908 extends to at least a height of the base. The method can include depositing site-based material (SM) within the base container 906. In some embodiments, the placing a base container 906 comprises placing a base container 906 comprising a polymer material. In some embodiments, the placing a base container includes placing a base container having a material cavity defined by a substantially planar bottom surface (e.g., ground level "G"), and a plurality of sidewalls extending vertically therefrom. In some embodiments, the depositing the site-based material comprises depositing site-based material selected from sand, rocks, and soil, and the site-based material fills a portion of the material cavity volume.

In some embodiments, the method includes removing site-based material from the worksite creating a material void. In some embodiments, the base container is placed within the material void.

In some embodiments, the method includes placing an environmental enclosure on one of the support column or spar. In some embodiments, the support column is connected to a sidewall of the base container.

In some embodiments, the method includes positioning an array of support columns at peripheral points within the base container, positioning a first spar relative to a first set of columns, the first spar disposed in a first direction, and positioning a second spar relative to a second set of columns, the second spar disposed in a second direction. In some embodiments, the first direction is different from the second direction.

Cathodic Protection Controller

Generally, cathodic protection is a way of preventing corrosion of metal structures in environments A (or in the presence of certain chemical agents) that may accelerate rusting or other corrosion of a given type of metal. Galvanic cathodic protection may be employed, in some cases, as a passive cathodic protection method. Galvanic cathodic protection of a given metal structure may involve coupling additional metal(s) to the given metal structure, where any additional metal used is a galvanic anode (i.e., has a lower electrode potential) with respect to the given metal structure. Galvanic cathodic protection may cause any additional metal to corrode and wear away over time, which may require physical replacement of such additional metal(s) in order to maintain a desired level of cathodic protection (CP).

Where direct current can be applied to the given metal structure, a different kind of cathodic protection may be achieved. Such impressed current cathodic protection (ICCP) may provide more effective protection for the given metal structure than galvanic CP. Yielding further improvement, a DC power source used to apply the direct current to the given metal structure may be adjusted for efficiency and efficacy. Such adjustments may be automated by a smart controller with CP capabilities. Additionally, such a CP controller may be able to detect presence of corrosion and corroded locations on a given metal structure. In some embodiments, a CP controller may allow for AC power input.

Benefits of such CP controllers may be realized in extreme environments that often accompany extraction and transportation of oil and gas resources. For example, metal structures and components of oil and/or gas pipelines, equipment for oil/gas production, stimulation, and/or extraction (e.g., drills, beams, pumps, tanks, pipes, manifolds, etc.), or other structures or vessels, especially to be deployed in deserts or at sea (e.g., derricks, workover rigs, casings, semi-submersible platforms, hulls, etc.). Any part of the structures, or pipelines, may be buried underground or submerged undersea, in whole or in part. CP requirements for land-based applications may differ from sea-based applications for any given level of protection desired.

In some embodiments, CP systems can be realized by electrodes, connected to a cathode (being the given metal structure to be protected) and an anode (being an additional metal structure of a different type that is more resistant to corrosion than the cathode). Such electrodes of CP systems can be AC-powered or DC-powered, for ICCP. Cathodes and anodes each may include at least one terminal for connecting a power source or other power supply via cables or other conductors.

The cables or conductors that connect to cathodes or anodes may be intermediately connected to corresponding terminals of a CP system. A smart CP system may be configured to regulate DC power with controlled output parameters. Additionally, via at least one of a voltmeter, ammeter, ohmmeter, reference electrode, or other instrumentation, at various parts of the given metal structure to be protected, the smart CP system may be able to determine location(s) of corrosion over time, e.g., on a cathode or also on an anode where possible. Detection may be performed by at least one algorithm applied to at least one measured value of electrical properties, e.g., at a reference electrode with respect to other electrodes (cathode and/or anode), or by other measurements (e.g., of voltage, current, and/or resistance/conductance) at designated points.

For such controlled output as described above, the smart CP controller can be configured to adjust output from 0V up to nominal values of 24 V, 50 V, 100 V, to list some non-limiting example values, and also to reduce the output potential to 0V, and repeat the process in any pattern or cycle. Depending on the condition of the given metal structure, the state of corrosion, and the length of the given metal structure to be protected (e.g., pipeline), electrical consumption of the CP system may vary, especially as may be necessary to prevent corrosion under given environmental conditions or to prevent further corrosion once existing corrosion has been detected.

Another aspect of smart CP controller is modularity, including with other power controllers for autonomous management of remote equipment, in some example embodiments. Hot-pluggable CP controller modules can be added to power- and communication-buses, such as included with at least one maximum power point tracker (MPPT) and/or multi-purpose microcontroller unit(s), and may be configured to detect other modules (CP controllers or otherwise) automatically (e.g., in a plug-and-play manner or according to a given specification), adapting control relationships and electrical characteristics for redundancy, for example. For at least this purpose, the modules themselves may configured for galvanic isolation. Thus, multiple CP controllers may operate in parallel, in some embodiments, and may be responsive to central, federated, or distributed control and/or monitoring, for example.

In an embodiment of an example system, a solution may be specially designed for cathodic protection. As a result of efficiency optimization based on algorithms that adjust power output in response to detected electrical characteristics of cathodes, anodes, and/or earth/ground (e.g., via at least one reference electrode), CP controller module(s) may allow for considerable reduction of power consumption and any power supply or storage (e.g., batteries) that may be used for CP, as well as engineered design of the CP controller itself allowing for significant reduction in size and/or mass of CP controller electronics.

Figure 11:
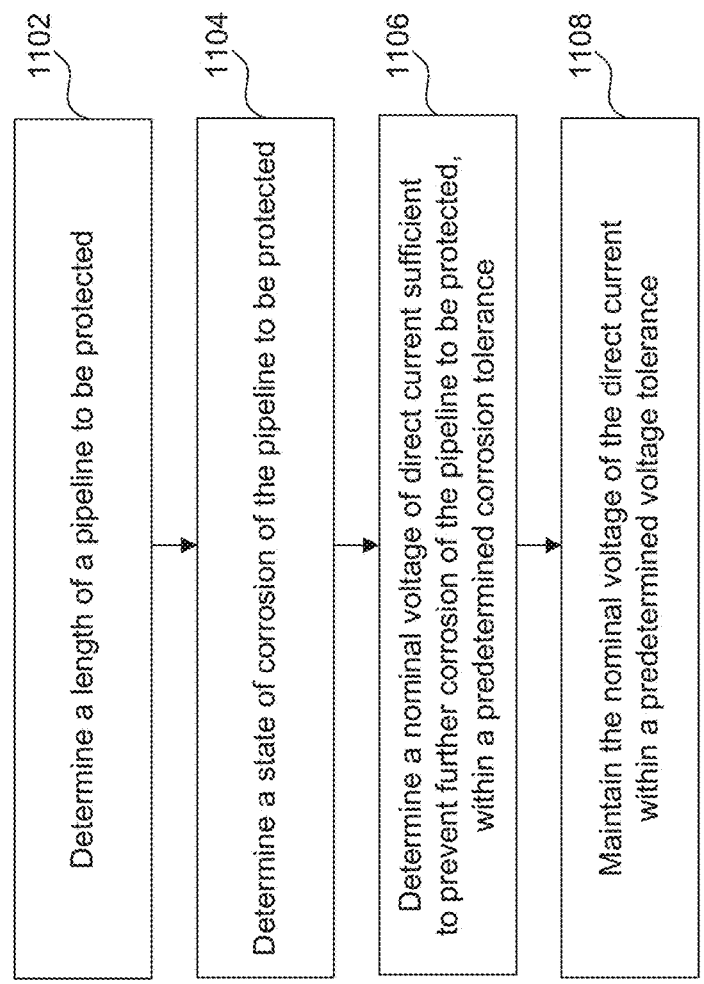
FIG. 11 is a flowchart illustrating a method for intelligent automated management of a cathodic protection system according to an embodiment.

FIG. 11 is a flowchart illustrating a method 1100 for intelligent automated management of a cathodic protection system, according to some embodiments. Method 1100 can be performed by processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the enhanced techniques of the disclosure provided herein. Further, some of the steps may be performed simultaneously, or in a different order from that shown in FIG. 11, and additional steps/operations can be added, as will be understood by a person of ordinary skill in the art.

While method 1100 shall be described with reference to FIG. 11, method 1100 is not limited to this example embodiment. In method 1100, a CP system comprising at least one processor coupled to memory storing instructions that, when executed, cause the at least one processor to perform operations or steps such as those described in more detail below.

In 1102, a processor such as processor 1304 can determine a length of a pipeline to be protected, determine a state of corrosion of the pipeline to be protected, according to an embodiment. In other embodiments, any other metal structure may be used instead of the pipeline. Such pipeline or other structures may function as a cathode, i.e., structure to be protected by CP. In some embodiment, the length determination may be made by electrical, electromagnetic, electromechanical, sonic, ultrasonic, or other equivalent means of measurement. In other embodiments, length determination may be made by reading data objects gathered from at least one data store, which may be located in at least one controller unit, at least one remote server, at least one segment of the pipeline (structure), or any combination there of.

In 1104, processor 1304 can determine a state of corrosion of the pipeline to be protected, according to an embodiment. In some embodiment, the length determination may be made by electrical, electromagnetic, electromechanical, sonic, ultrasonic, or other equivalent means of measurement, to name a few non-limiting examples. One such example may include tracking such measurements over time, e.g., to detect a later increase in electrical resistance along a particular segment of pipeline, in an embodiment.

In 1106, processor 1304 can determine a nominal voltage of direct current sufficient to prevent further corrosion of the pipeline to be protected, within a predetermined corrosion tolerance, to name a few non-limiting examples. In some embodiments, a higher voltage in some parts of the pipeline (structure), and/or lower voltage in other parts, may be sufficient or necessary to prevent further corrosion, or at least to reduce risk of further corrosion, in affected parts of the pipeline or cathodic structure. Algorithms to determine this nominal voltage may be selected and/or adjusted depending on the material of the cathodic structure, size dimensions (mass, thickness, length, etc.) of the cathodic structure, state of corrosion, etc.

In 1108, processor 1304 can maintain the nominal voltage of the direct current within a predetermined voltage tolerance, for example. In order to maintain a certain nominal voltage, it may be necessary for a controller or system to adjust the nominal voltage of direct current from 100V to 0V and from 0V to 100V, across one or more CP controllers, for example, according to the determination of 1106. Additionally, the same or different parts of the one or more CP controllers (e.g., rectifiers, power supply circuits, etc.) can dynamically adjust electrical output (AC or DC) to a given voltage level or range. Other embodiments include setting nominal and output voltages to 50V or 24V, to name a few non-limiting examples, and maintaining the new setting with corresponding electrical output.

Method 1100 is disclosed in the order shown above in this exemplary embodiment of FIG. 11. In practice, however, the operations disclosed above, alongside other operations, may be executed sequentially in any order, or they may alternatively be executed concurrently, with more than one operation being performed simultaneously, or any combination of the above. Additionally or alternatively, any simultaneous, concurrent, or sequential operations may be performed simultaneously, concurrently, and/or sequentially, and independently of or dependently on any other operation(s) that may be running elsewhere, for example.

In some embodiments, the CP system can further comprise a central control unit configured to control one or more CP controllers remotely, for example. Additional embodiments of the CP system may include one or more CP controllers configured to operate in a switched-mode topology.

Further embodiments of the CP system may detect a fault in the pipeline, determine a location of the fault in the pipeline, determine that the fault is a result of at least one of an electrode failure or the corrosion in the pipeline, send a notification of the fault, and increase the nominal voltage of the direct current supplied by the at least one electrode nearest to the location of the fault in the pipeline.

By using the CP controller like integrated part of a smart power storage transfer architecture and power asset command-and-control architecture, such integrated solutions may be offered to provide remote monitoring of multiple parameters and remote control of output current and voltage for robust and autonomous CP infrastructure. For additional information, see, for example, U.S. patent application Ser. No. 16/196,906, filed Nov. 20, 2018; U.S. patent application Ser. No. 15/385,627, filed Dec. 20, 2016; and U.S. patent application Ser. No. 15/065,543, filed Mar. 9, 2016 (now U.S. Pat. No. 9,965,016). Modular structure of CP controllers may offer advantages at least in terms of reliability, scalability, redundancy, and other aspects especially useful in maintaining CP across long pipelines for oil and/or gas transportation. In combination with the other features that are presented, the system may be used unattended and without in any inhospitable environments, even in the event of a fault or advanced corrosion in a pipeline or other metal structure to be protected.

Panel Soiling Detection and Mitigation

According to some embodiments, at least one algorithm may be implemented on at least one microcontroller unit (e.g., in hardware, firmware, software, or any combination thereof) to determine when on-site panels, such as solar panels including photovoltaic cells and arrays thereof, may be soiled such that dust or other foreign matter on or near the surface of at least one photovoltaic cell interferes with reception of light at the at least one photovoltaic cell, which may therefore reduce the amount of luminous energy converted to electric energy and/or which may reduce efficiency of such conversion. Such obstructions may thus reduce effectively time and/or amount of solar irradiance in a given day, potentially to a point of being insufficient to deliver a full change to storage batteries, for example. For additional information and alternative solutions. For additional information, see, for example, U.S. patent application Ser. No. 16/196,906, filed Nov. 20, 2018. In situations where solar energy is degraded for exceptional circumstances (e.g., weather phenomena, dust storms, eclipses, etc.), added materials soiling solar panels may further compound the given decrease in available solar energy.

While degraded energy sources may be beyond the control of a given power generation device or system, automatically detecting and mitigating panel soiling may be controlled algorithmically, and may further include use of various cleaning techniques and/or devices.

In an embodiment, an algorithm may respond to data received from a solar irradiance sensor providing available power of the sun at some given moment, periodically, or the like. Measurement units may, in some non-limiting examples, be represented in units of watts per square meter or ergs per square centimeter per second, although any physically equivalent units may also be used instead. By evaluating area measurements corresponding to the total surface area (e.g., in square meters, square centimeters, etc.) of available solar panels, a smart controller may make calculations in accordance with an algorithm, which may include a series of calculations, in some embodiments.

In a further embodiment, the algorithm may make a comparison between the total available power from the sun and the actual generated power from the solar chargers in the system. If there is a significant difference between the two values (e.g., exceeding an absolute or proportional threshold with respect to the total or actual value), the smart controller can send a signal or notification indicating soiling on the solar panels. The smart controller may further send another signal trough a channel for remote monitoring, so as to have a maintenance team dispatched, in some embodiments.

Because the solar irradiance sensor may be placed in the same environmental conditions as the solar panels, the irradiance sensor may also be polluted. In order to keep the solar irradiation sensor relatively clean for more reliable measurements, the system may be configured to clean the sensor by an automatic process, electrostatically polarizing the particles attached to the surface of the sensor and repelling the particles away using force of electric charge. By gravity and/or other natural occurrences, such as wind, such particles may fall away, such as to the ground. Similar processes may be employed for cleaning the solar panels themselves, such as in cases where maintenance teams may be too remote for convenient dispatch.

Additionally or alternatively, in other embodiments, other automated mechanical and/or electromagnetic processes may be employed to clean active surfaces of the photovoltaic cell(s) and irradiance sensor(s) on or near solar panels. For example, a gas or liquid stream or spray, such as of forced air, nitrogen gas, water, or a cleansing solution, may be applied to the surface of an irradiance sensor or photovoltaic cell on a solar panel to carry away any particles or foreign matter obstructing the optical properties of the surface of a photovoltaic cell or irradiance sensor, in some embodiments.

Depending on sensitivity of a given surface to scratching or other damage in contact with foreign objects or particulate impurities from the environment, electromechanical devices may be used, e.g., robotic wiping mechanisms with a rubber or fabric interface against a given irradiance sensor or solar panel, to roll across a given part of a surface (or entire surface), or rotate about a fixed or movable pivot point.

On a different scale, microelectromechanical systems (MEMS) or micro-opto-electromechanical systems (MO-EMS) may be deployed on affected surfaces or integrated therein, to carry away or repel foreign particulate matter or other impurities actively or passively. Depending on configuration, such MEMS may respond to signals from the irradiance sensor(s) or from a smart controller, or may respond directly to electrical, optical, or mechanical detection of a foreign object on the affected surface.

Such automated systems for cleaning optical elements or other structures of remote installations that need unattended power delivery allow for considerable reductions in maintenance costs and staffing that may otherwise be required to maintain and operate certain facilities, e.g., for powering and monitoring activity and health of resource extraction and transportation equipment in various remote or inhospitable locations. Integration of these technologies and management algorithms therefor into smart grids and redundant, hot-pluggable controller architectures thus enables further cost-savings and efficiencies of deployment and management of underlying infrastructure. For additional information, see, for example, U.S. patent application Ser. No. 15/385,627, filed Dec. 20, 2016, and U.S. Pat. No. 9,965,016.

Figure 12:
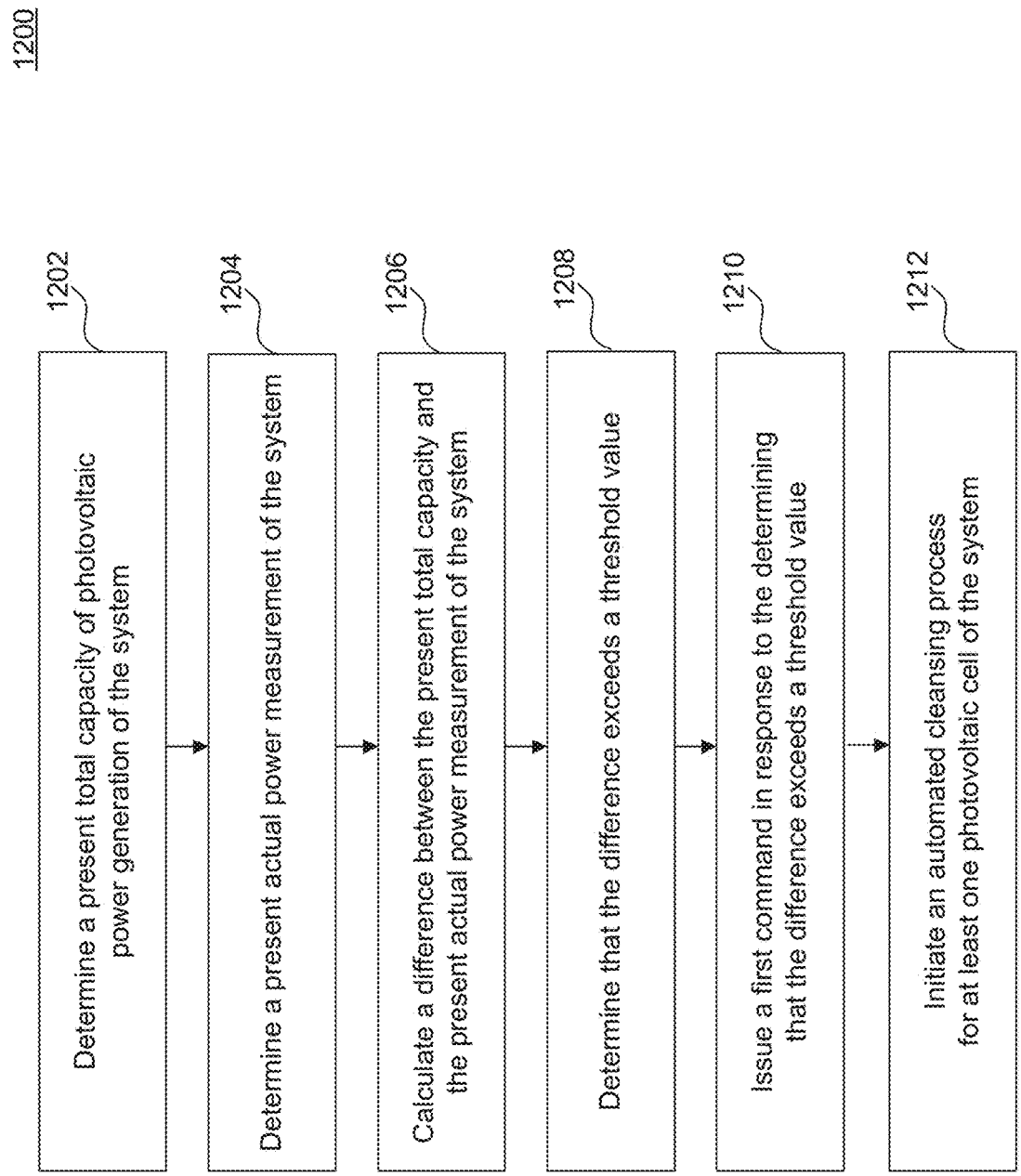
FIG. 12 is a flowchart illustrating a method for intelligent automated management of a cleaning system for optical elements in a solar power generation system according to an embodiment.

FIG. 12 is a flowchart illustrating a method 1200 for intelligent automated management of a cleaning system for optical elements in a solar power generation system, according to some embodiments. Method 1200 can be performed by processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the enhanced techniques of the disclosure provided herein. Further, some of the steps may be performed simultaneously, or in a different order from that shown in FIG. 12, as will be understood by a person of ordinary skill in the art.

While method 1200 shall be described with reference to FIG. 12, method 1200 is not limited to this example embodiment. In method 1200, a CP system comprising at least one processor coupled to memory storing instructions that, when executed, cause the at least one processor to perform operations or steps such as those described in more detail below.

In 1202, a processor, such as processor 1304, can determine a present total capacity of photovoltaic power generation of the system, to name one non-limiting examples of a determination or measurement. Other parameters can be measured or determined, based on capacity of power generation, other system parameters, and/or other environmental conditions, for example.

In 1204, processor 1304 can determine a present actual power measurement of the system, according to an embodiment. In other embodiments, other system parameters or actual performance metrics can be determined instead of or in addition to actual power measurement.

In 1206, processor 1304 can calculate a difference between the present total capacity and the present actual power measurement of the system, to name one possible non-limiting example of a measurement or calculation that can be directly or indirectly indicative of panel soiling. Other calculations may relate to other electromagnetic, optical, chemical, and/or mechanical parameters, for example.

In 1208, processor 1304 can determine that the difference exceeds a threshold value. The threshold value can be a fixed or predetermined value, in some embodiments. In other embodiments, the threshold can be dynamically adjusted to account for astronomical, seasonal, or weather conditions, to name a few non-limiting examples.

In 1210, processor 1304 can issue a first command in response to the determining that the difference exceeds the threshold value. The first command can include a notification, e.g., to an operator or central control unit, or can be for activation or actuation of additional systems that may be needed for automated cleansing (cleaning) process(es).

In 1212, processor 1304 can initiate an automated cleansing process with respect to at least one photovoltaic cell of the system upon receipt of a second command from the at least one processor or another processor. The second command can be a signal indicating readiness of additional systems that may be needed for the automated cleansing process. If any such additional systems provide a particular indication, a second command may not be issued to cause the system or processor 1304 to initiate the automated cleansing process in such situations. The particular indication may be an indication indicate that automated cleansing is not required or not possible, in some cases. In some embodiments, the particular indication may signify that at least some of the additional systems are offline or otherwise not ready, or that the last instance of automated cleansing is within a predetermined threshold of elapsed time since the last instance to the present time, to name a few non-limiting examples.

Method 1200 is disclosed in the order shown above in this exemplary embodiment of FIG. 12. In practice, however, the operations disclosed above, alongside other operations, may be executed sequentially in any order, or they may alternatively be executed concurrently, with more than one operation being performed simultaneously, or any combination of the above. Additionally or alternatively, any simultaneous, concurrent, or sequential operations may be performed simultaneously, concurrently, and/or sequentially, and independently of or dependently on any other operation(s) that may be running elsewhere, for example.

In some embodiments, additional steps may be performed, including electrostatically polarizing an electrode adjacent to the at least one photovoltaic cell, electromechanically engaging an irrigation mechanism adjacent to the at least one photovoltaic cell, electromechanically reorienting or repositioning the at least one photovoltaic cell with respect to a fluid current, electromechanically reorienting or repositioning the at least one photovoltaic cell with respect to gravitational acceleration, and/or electromechanically reorienting or repositioning the at least one photovoltaic cell with respect to a shelter structure. Some of these repositioning operations may be regarded similarly to shaking off impurities, feathering panels into a stream of flowing air (wind), or turning panels against such a flow, to increase wind resistance.

Figure 13:
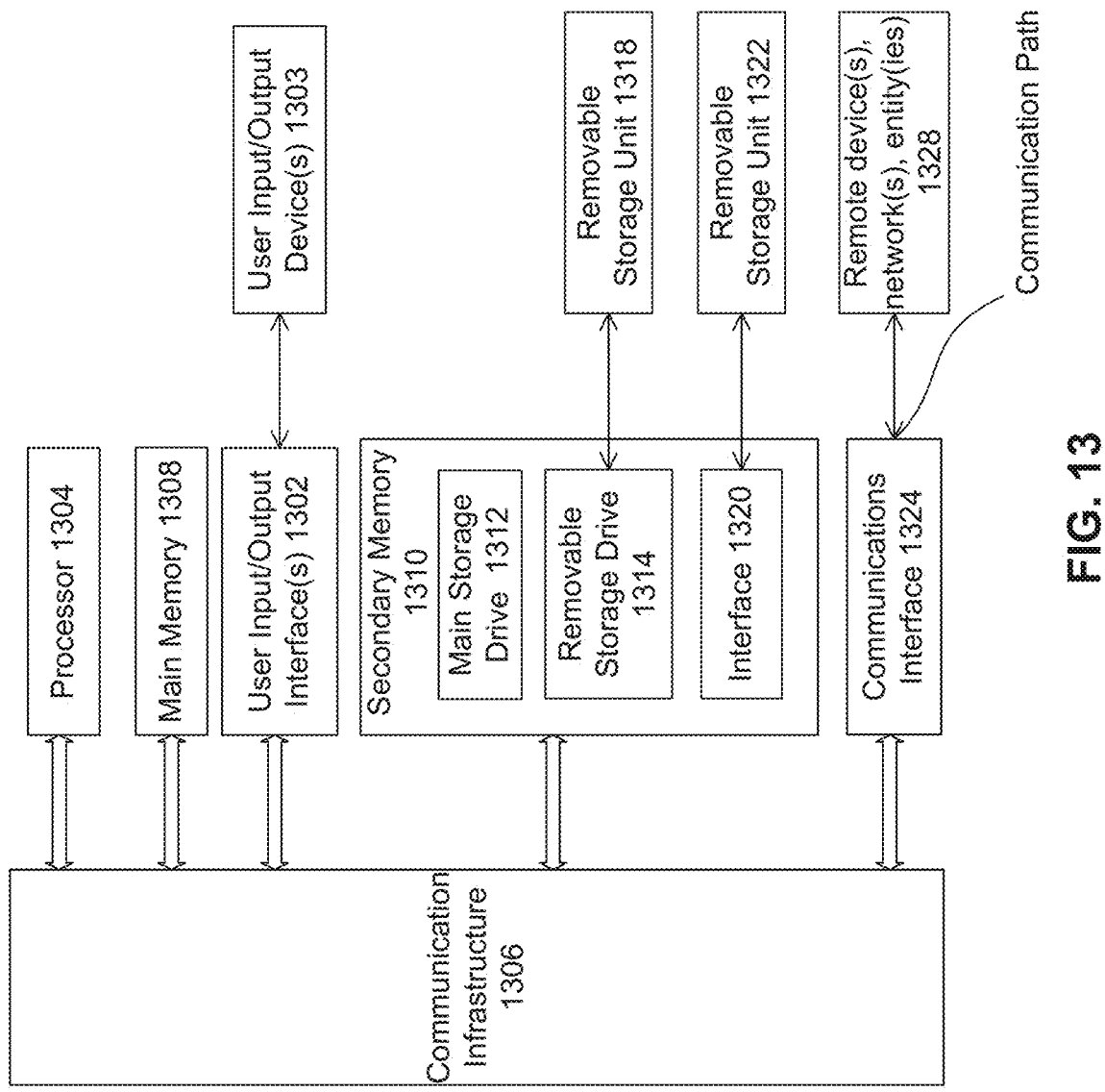
FIG. 13 is a block diagram depicting an example computer system useful for implementing various embodiments.

Any embodiments of the methods of method 1100 or method 1200 can be implemented on a specialized or general-purpose computing device configured to interface with the physical devices and systems described above (e.g., measurement, telemetry, control, communication, etc.). Turning to FIG. 13, one example of such a computing device or computer system is shown in the drawings and described below.

Example Computer System

Various embodiments may be implemented, for example, using one or more well-known computer systems, such as computer system 1300 shown in FIG. 13. One or more computer systems 1300 can be used, for example, to implement any of the embodiments discussed herein, as well as combinations and sub-combinations thereof.

Computer system 1300 can include one or more processors (also called central processing units, or CPUs), such as a processor 1304. Processor 1304 can be connected to a communication infrastructure or bus 1306.

Computer system 1300 can include one or more processors (also called central processing units, or CPUs), such as a processor 1304. Processor 1304 can be connected to a bus or communication infrastructure 1306.

Computer system 1300 can also include user input/output device(s) 1303, such as monitors, keyboards, pointing devices, etc., which may communicate with communication infrastructure 1306 through user input/output interface(s) 1302.

One or more of processors 1304 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 1304 can include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 1300 can also include a main or primary memory 1308, such as random access memory (RAM). Main memory 1308 can include one or more levels of cache. Main memory 1308 can have stored therein control logic (i.e., computer software) and/or data.

Computer system 1300 can also include one or more secondary storage devices or secondary memory 1310. Secondary memory 1310 can include, for example, a main storage drive 1312 and/or a removable storage device or drive 1314. Main storage drive 1312 can be a hard disk drive or solid-state drive, for example. Removable storage drive 1314 can be a floppy disk drive, a magnetic tape drive, a compact disk drive, an optical storage device, tape backup device, and/or any other storage device/drive.

Removable storage drive 1314 can interact with a removable storage unit 1318. Removable storage unit 1318 can include a computer usable or readable storage device having stored thereon computer software (control logic) and/or data. Removable storage unit 1318 can be a floppy disk, magnetic tape, compact disk, DVD, optical storage disk, and/any other computer data storage device. Removable storage drive 1314 can read from and/or write to removable storage unit 1318.

Secondary memory 1310 can include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 can further include a communication or network interface 1324. Communication interface 1324 can enable computer system 1300 to communicate and interact with any combination of external devices, external networks, external entities, etc. (individually and collectively referenced by reference number 1328). For example, communication interface 1324 can allow computer system 1300 to communicate with external or remote devices 1328 over communication path 1326, which may be wired and/or wireless (or a combination thereof), and which may include any combination of LANs, WANs, the Internet, etc. Control logic and/or data can be transmitted to and from computer system 1300 via communication path 1326.

Computer system 1300 can also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers, including blockchain uses.

Computer system 1300 can be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs can interface with or be implemented in any programming language, procedural, functional, or object-oriented, and may be assembled, compiled, or interpreted. Non-limiting examples include assembly language for any given controller or processor architecture, C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Emberjs, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), may cause such data processing devices to operate as described herein.

Based on the information contained in this disclosure, it will be apparent to persons skilled in the relevant art(s) how to make and use embodiments of this disclosure using data processing devices, computer systems and/or computer architectures other than that shown in FIG. 13. In particular, embodiments may operate with software, hardware, and/or operating system implementations other than those described herein.

CONCLUSION

The Summary and Abstract sections can set forth one or more but not all exemplary embodiments of the present disclosure as contemplated by the inventor(s), and thus, are not intended to limit the present disclosure and the appended claims in any way.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present invention.

Features of each embodiment disclosed may be used in each of the other embodiments disclosed.

Therefore, such adaptations and modifications are intended to be within the meaning and range of equivalents of the disclosed embodiments, based on the disclosure and guidance presented herein. It is to be understood that the phraseology or terminology herein is for the purpose of description and not of limitation, such that the terminology or phraseology of the present specification is to be interpreted by the skilled artisan in light of the disclosure and guidance.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the disclosure should not be limited by any of the above-described exemplary embodiments, but should be defined only in accordance with the following claims and their equivalents.

What is claimed is:

1. An environmental enclosure, comprising:
   sidewalls defining an enclosure volume housing a battery or other energy storage device, each of the sidewalls having an internally facing surface and an externally facing surface; and
   first and second solar shields, each comprising a reflective surface, the solar shields extending substantially perpendicularly to the base of the environmental enclosure and spaced a first and second distance, respectively, externally from the enclosure volume and each connected to a sidewall extending substantially perpendicularly to the base of the environmental enclosure, wherein the first and second solar shields form a step structure, the first and second distances each defining a portion of a respective flow area, and
   wherein each flow area is configured to produce stack effect draft.

2. The environmental enclosure of claim 1, further comprising:
   the battery within the enclosure volume comprising at least one of a lead-acid battery, lithium-ion battery, sodium-ion battery, potassium-ion battery, nickel-based battery, polymer-based battery, polysulfide bromide battery, silver-oxide battery, metal-air silicon-air battery, glass battery, organic radical battery, and rechargeable fuel cell.

3. The environmental enclosure of claim 1, wherein the stack effect draft is proportional to one of the flow area and the square root of an effective height of the first and second solar shields, respectively.

4. The environmental enclosure of claim 1, further comprising a third solar shield disposed on a roof of the environmental enclosure, wherein the stack effect draft is directed between the third solar shield disposed on a roof of the environmental enclosure and the roof of the environmental enclosure.

5. The environmental enclosure of claim 1, wherein each solar shield has a solar reflectance index configured to optimize reflectance.

6. The environmental enclosure of claim 1, wherein the first and second solar shields are each substantially planar along the area of the sidewall, and are positioned substantially parallel thereto.

7. The environmental enclosure of claim 1, further comprising:
   a third solar shield comprising a third reflective surface, the third solar shield spaced a third distance externally from the enclosure volume different from the first distance.

8. The environmental enclosure of claim 7, wherein the third distance is greater than the first distance.

9. The environmental enclosure of claim 1, further comprising: a battery chamber within the enclosure volume configured to house the battery, the battery chamber comprising: insulated chamber sidewalls defining a chamber volume; a chamber top wall enclosing the chamber volume; and a heat exchange system configured to maintain the battery chamber between about 15° C. and 30° C.

10. The environmental enclosure of claim 9, wherein the insulated chamber sidewalls have an R-value specified to maintain a specific temperature differential.

11. The environmental enclosure of claim 9, the heat exchange system further comprising:
    a fan disposed within the battery chamber.

12. The environmental enclosure of claim 9, wherein the heat exchange system does not include a vapor compression system.

13. The environmental enclosure of claim 9, the heat exchange system further comprising:
    a fan disposed within the enclosure volume and outside of the battery chamber and configured to produce airflow across a heat sink in thermal contact with a Peltier element, wherein a voltage is applied across the Peltier element to dislodge particles attached to the heat sink.

14. The environmental enclosure of claim 9, wherein the heat exchange system is configured to cool the battery chamber when a temperature of the battery chamber exceeds a first threshold for a first duration, and wherein the heat exchange system is configured to heat the battery chamber when a temperature of the battery chamber is below a second threshold for a second duration, such that the temperature of the battery chamber is stabilized.

15. The environmental enclosure of claim 9, the heat exchange system further comprising:
    a Peltier element disposed between an inner surface of the battery chamber and an outer surface of the battery chamber, the Peltier element being configured to selectively heat or cool the battery chamber.

16. The environmental enclosure of claim 15, the heat exchange system further comprising:
    a heat sink in thermal contact with a surface of the Peltier element and in thermal contact with a heat pipe, such that the heat sink transfers heat between the Peltier element and the heat pipe.

17. The environmental enclosure of claim 15, wherein the heat exchange system further comprising:
    a heat sink in thermal contact with a surface of the Peltier element.

18. The environmental enclosure of claim 17, wherein the heat sink is disposed within the battery chamber.

19. The environmental enclosure of claim 17, wherein the heat sink is disposed within the enclosure volume.

20. The environmental enclosure of claim 17, wherein the heat sink is disposed outside the enclosure volume.

* * * * *